(12) United States Patent
Nakagawa et al.

(10) Patent No.: US 12,093,007 B2
(45) Date of Patent: Sep. 17, 2024

(54) POWER CONTROL SYSTEM AND PROGRAM

(71) Applicant: DAIKIN INDUSTRIES, LTD., Osaka (JP)

(72) Inventors: Yoshihiro Nakagawa, Osaka (JP); Shuji Furui, Osaka (JP); Takuya Nakao, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/029,186

(22) PCT Filed: Aug. 13, 2021

(86) PCT No.: PCT/JP2021/029823
§ 371 (c)(1),
(2) Date: Mar. 29, 2023

(87) PCT Pub. No.: WO2022/070633
PCT Pub. Date: Apr. 7, 2022

(65) Prior Publication Data
US 2023/0273580 A1    Aug. 31, 2023

(30) Foreign Application Priority Data
Sep. 30, 2020  (JP) .................... 2020-165452

(51) Int. Cl.
*G05B 19/042*    (2006.01)
*H02J 3/28*    (2006.01)
*H02J 13/00*    (2006.01)

(52) U.S. Cl.
CPC .............. *G05B 19/042* (2013.01); *H02J 3/28* (2013.01); *H02J 13/00006* (2020.01); *G05B 2219/2639* (2013.01)

(58) Field of Classification Search
CPC . G05B 19/042; G05B 2219/2639; H02J 3/28; H02J 13/00006
See application file for complete search history.

(56) References Cited

U.S. PATENT DOCUMENTS

2013/0211752 A1* 8/2013 Shi ...................... G06F 11/3024
                                                              702/61
2015/0076926 A1  3/2015 Kosaka et al.
(Continued)

FOREIGN PATENT DOCUMENTS

CN   104247193 A   12/2014
JP   50-107444 A   8/1975
(Continued)

OTHER PUBLICATIONS

International Search Report (PCT/ISA/210) issued in PCT/JP2021/029823 mailed on Oct. 5, 2021.
(Continued)

*Primary Examiner* — Ziaul Karim
(74) *Attorney, Agent, or Firm* — BIRCH, STEWART, KOLASCH & BIRCH, LLP

(57) ABSTRACT

A power control system performs power control such that a target power set for a group including a plurality of units of power consumption is not exceeded. The system includes a limit value setting unit that sets, for each of the units of power consumption, a limit value of power usage for a predetermined time period based on the target power, and an adjustment unit that adjusts, within the predetermined time period, the limit value of each of the units of power consumption based on an actual result of power usage within the predetermined time period.

8 Claims, 13 Drawing Sheets

(56) References Cited

U.S. PATENT DOCUMENTS

| | | | |
|---|---|---|---|
| 2016/0004297 A1* | 1/2016 | Kazuno | G06Q 30/06 |
| | | | 713/320 |
| 2016/0197474 A1 | 7/2016 | Aisu et al. | |
| 2017/0234562 A1* | 8/2017 | Ribbich | F24F 11/86 |
| | | | 700/277 |
| 2018/0284758 A1* | 10/2018 | Cella | H04L 1/18 |

FOREIGN PATENT DOCUMENTS

| | | |
|---|---|---|
| JP | 63-121431 A | 5/1988 |
| JP | 2001-211547 A | 8/2001 |
| JP | 2003-32887 A | 1/2003 |
| JP | 2019-30087 A | 2/2019 |
| WO | WO 2017/131026 A1 | 8/2017 |
| WO | WO 2022/054442 A1 | 3/2022 |

OTHER PUBLICATIONS

Extended European Search Report for European Application No. 21874936.4, dated Mar. 11, 2024.

* cited by examiner

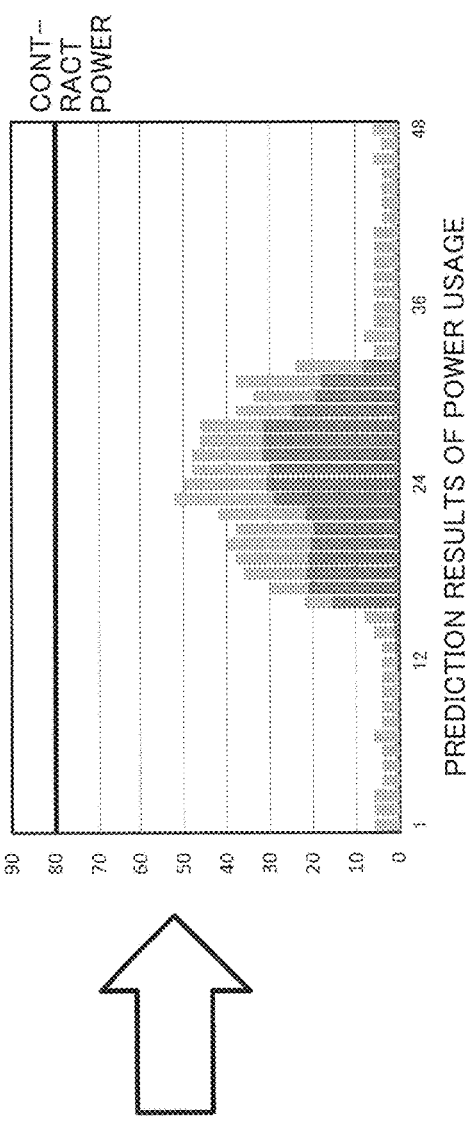

FIG.6A

ACTUAL RESULT OF POWER USAGE THREE DAYS BEFORE

ACTUAL RESULT OF POWER USAGE TWO DAYS BEFORE

ACTUAL RESULT OF POWER USAGE ONE DAY BEFORE

PAST ACTUAL RESULT VALUES

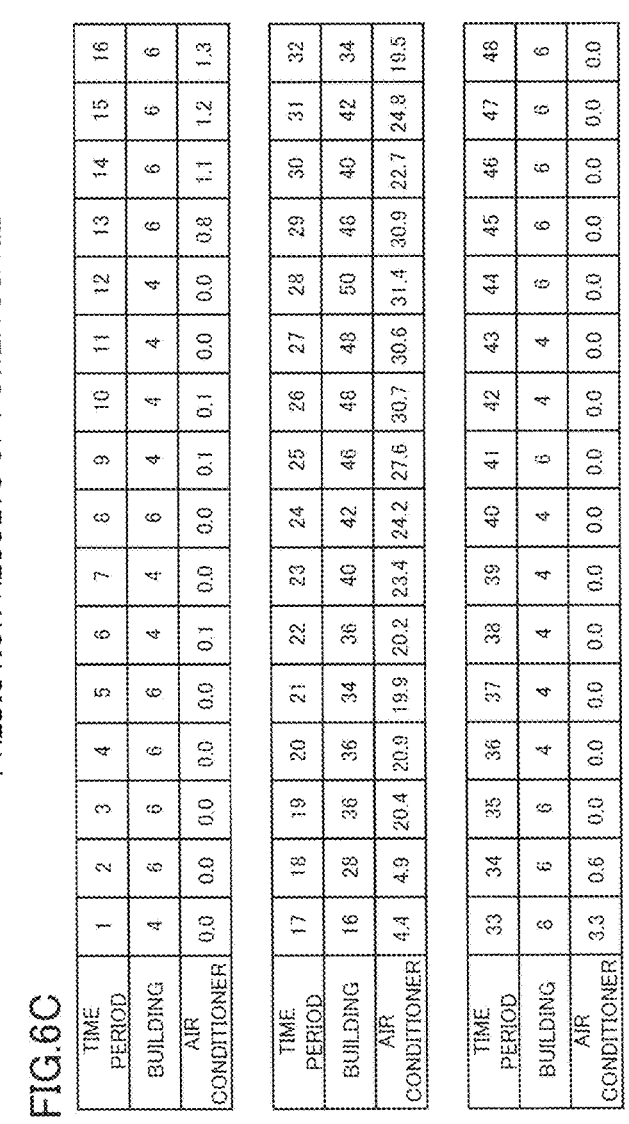

FIG.6B

PREDICTION RESULTS OF POWER USAGE

FIG.6C

| TIME PERIOD | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| BUILDING | 4 | 6 | 6 | 6 | 6 | 6 | 4 | 6 | 4 | 4 | 4 | 4 | 6 | 6 | 6 | 6 |
| AIR CONDITIONER | 0.0 | 0.0 | 0.0 | 0.0 | 0.0 | 0.1 | 0.0 | 0.0 | 0.1 | 0.1 | 0.0 | 0.0 | 0.8 | 1.1 | 1.2 | 1.3 |

| TIME PERIOD | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| BUILDING | 16 | 28 | 36 | 36 | 34 | 36 | 40 | 42 | 46 | 48 | 48 | 50 | 46 | 40 | 42 | 34 |
| AIR CONDITIONER | 4.4 | 4.9 | 20.4 | 20.9 | 19.9 | 20.2 | 23.4 | 24.2 | 27.6 | 30.7 | 30.6 | 31.4 | 30.9 | 22.7 | 24.8 | 19.5 |

| TIME PERIOD | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| BUILDING | 6 | 6 | 6 | 4 | 4 | 4 | 4 | 4 | 6 | 4 | 4 | 4 | 6 | 6 | 6 | 6 |
| AIR CONDITIONER | 3.3 | 0.6 | 0.0 | 0.0 | 0.0 | 0.0 | 0.0 | 0.0 | 0.0 | 0.0 | 0.0 | 0.0 | 0.0 | 0.0 | 0.0 | 0.0 |

PREDICTION OF POWER USAGE OF CONSUMER OVER 48 TIME PERIODS OF ONE DAY

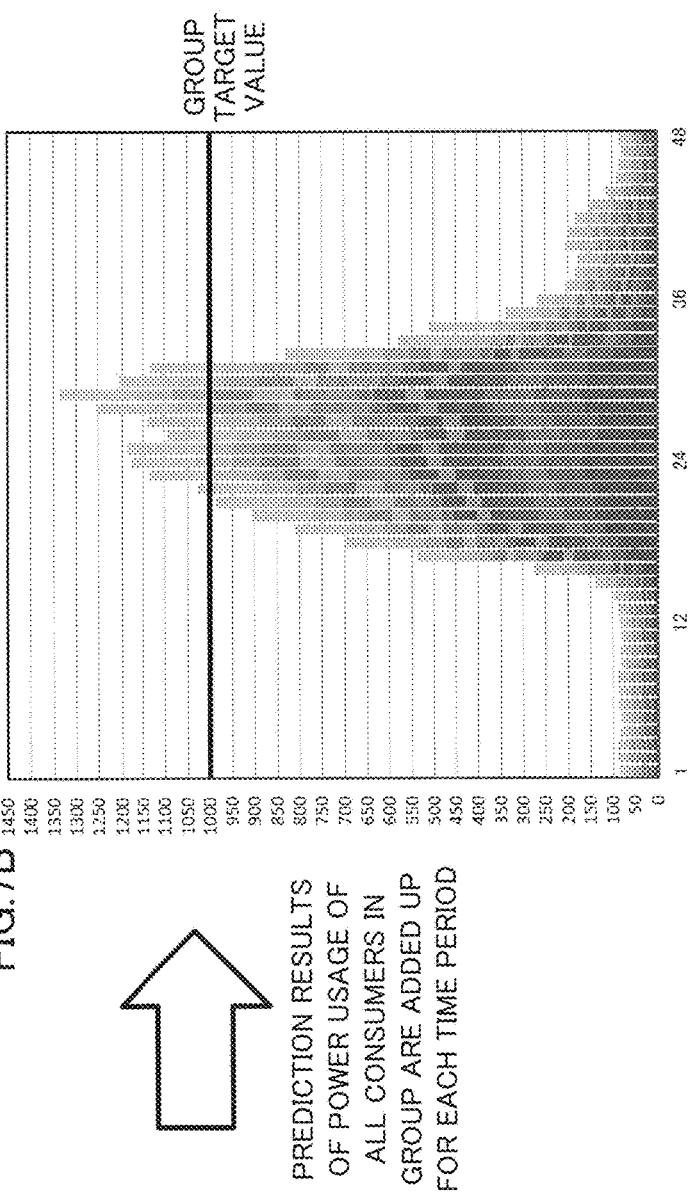
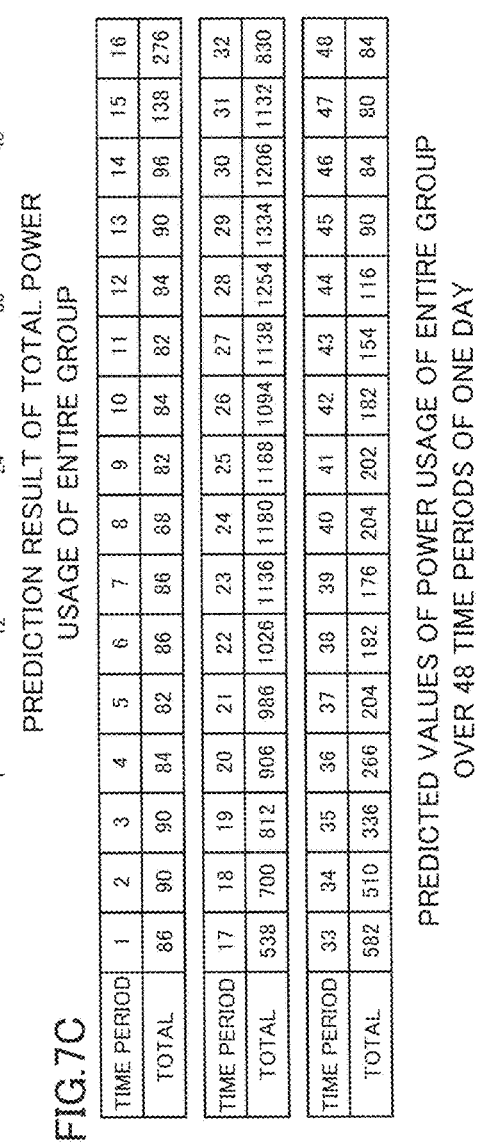
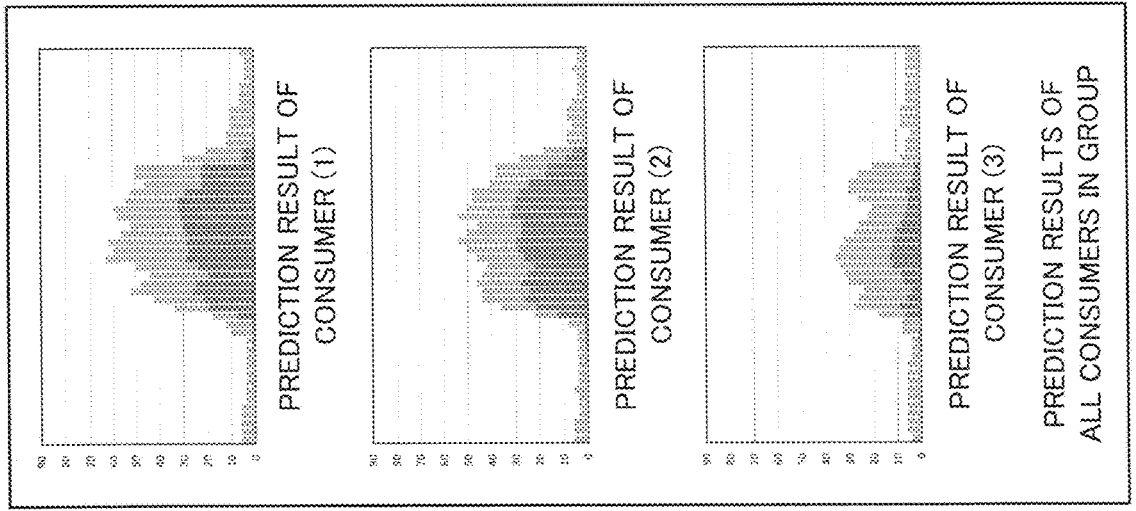

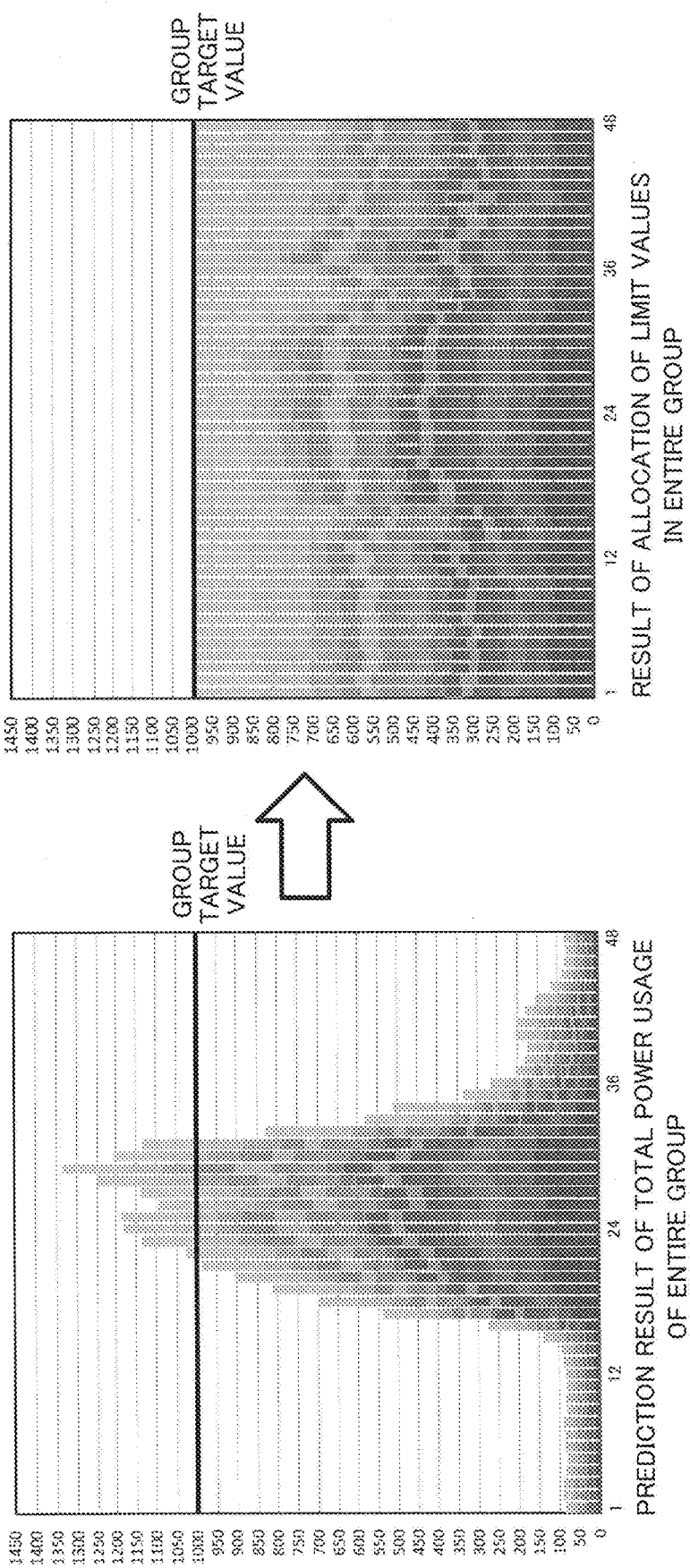
FIG.8A PREDICTION RESULT OF TOTAL POWER USAGE OF ENTIRE GROUP
FIG.8B RESULT OF ALLOCATION OF LIMIT VALUES IN ENTIRE GROUP
FIG.8C LIMIT VALUES OF CONSUMER (1)

POWER CONTROL SYSTEM AND PROGRAM

TECHNICAL FIELD

The present disclosure relates to a power control system and a program.

BACKGROUND ART

PTL 1 describes a power control system including a plurality of grouped consumers including a power meter that measures power consumption consumed by a load, and a control device that accepts power consumption measured by the power meter from each of the consumers, outputs group power consumption on a group-by-group basis by using the power consumption of each of the consumers, and performs control such that, when group power consumption of any group exceeds a group contract power set in advance for each group, the group power consumption of a power-exceeding group becomes equal to or less than the group contract power.

CITATION LIST

Patent Literature

PTL 1: Japanese Unexamined Patent Application Publication No. 2019-30087

SUMMARY OF INVENTION

Technical Problem

If power usage is controlled with a margin for safety in the control of each individual unit of power consumption such that target power set per group is not exceeded, unused power, which is a difference between the power usage of the entire group and the target power, may increase.

It is an object of the present disclosure to control power usage of a group including a plurality of units of power consumption such that control for each unit of power consumption is adjusted in accordance with the use of power by each individual unit of power consumption over each time period to reduce unused power in the entire group.

Solution to Problem

A power control system of the present disclosure is a power control system for performing power control such that a target power set for a group including a plurality of units of power consumption is not exceeded, the system including limit value setting unit that sets, for each of the units of power consumption, a limit value of power usage for a predetermined time period, based on the target power; and adjustment unit that adjusts, within the predetermined time period, the limit value of each of the units of power consumption for the predetermined time period, based on an actual result of power usage within the predetermined time period.

This configuration can control power usage of a group including a plurality of units of power consumption such that control for each unit of power consumption is adjusted in accordance with the use of power by each individual unit of power consumption over each time period to reduce unused power in the entire group.

The adjustment unit may adjust the limit value of each of the units of power consumption on condition that a difference between total power usage of the units of power consumption included in the group and the target power is equal to or greater than a predetermined value.

This configuration can adjust the limit values based on the total power usage of the units of power consumption and reduce the unused power in the entire group.

Further, the adjustment unit may adjust the limit value such that the units of power consumption interchange power usage, in accordance with power usage of each of the units of power consumption over the predetermined time period.

This configuration allows units of power consumption to interchange available power usage, which is indicated by the limit value, and can reduce the unused power in the entire group.

Further, the power control system may further include control unit that controls power usage of each of the units of power consumption, based on the limit value set by the limit value setting unit, and when there is the unit of power consumption whose power usage is reduced by control based on the limit value by the control unit, the adjustment unit may adjust the limit value of the unit of power consumption.

This configuration can adjust the limit values based on the control status for the units of power consumption and reduce the unused power in the entire group.

Further, the adjustment unit may adjust the limit value of each of the units of power consumption within a certain period preceding an end of the predetermined time period.

This configuration can provide appropriate control of the power usage for each unit of power consumption at the end of a time period in which actual power demands significantly affects the units of power consumption, and reduce the unused power in the entire group.

Further, the adjustment unit may increase the limit value of at least one unit of power consumption among the units of power consumption and decrease the limit value of at least another unit of power consumption among the units of power consumption in accordance with power usage of each of the units of power consumption over the predetermined time period.

This configuration allows units of power consumption to interchange available power usage, which is indicated by the limit value, and can reduce the unused power in the entire group.

Further, the adjustment unit may adjust the limit value of each of the units of power consumption such that a total amount of increase in the limit value of a unit of power consumption whose the limit value is increased does not exceed a total amount of decrease in the limit value of a unit of power consumption whose the limit value is decreased.

With this configuration, even when the limit values are adjusted, control is performed such that the total power usage of the units of power consumption does not exceed the target power, thereby making it possible to reduce the unused power in the entire group.

Further, the units of power consumption may be consumers, the limit value setting unit may set, for each of the consumers, a limit value of power usage for a predetermined time period, based on a target power set for a group of the consumers, and the adjustment unit may adjust the limit value of each of the units of power consumption for the predetermined time period, based on actual results of power usage of the consumers within the predetermined time period.

This configuration can control power usage of a group including a plurality of consumers such that control for each consumer is adjusted in accordance with the use of power by each individual consumer over each time period to reduce unused power in the entire group.

Further, the units of power consumption may be equipment devices, the limit value setting unit may set, for each of the equipment devices, a limit value of power usage for a predetermined time period, based on a target power set for a group of the equipment devices, and the adjustment unit may adjust the limit value of each of the units of power consumption for the predetermined time period, based on actual results of power usage of the equipment devices within the predetermined time period.

This configuration can control power usage of a group including a plurality of equipment devices such that control for each equipment device is adjusted in accordance with the use of power by each individual equipment device over each time period to reduce unused power in the entire group.

A program of the present disclosure is a program for causing a computer for controlling a system for performing power control such that a target power set for a group including a plurality of units of power consumption is not exceeded, to function as limit value setting unit that sets, for each of the units of power consumption, a limit value of power usage for a predetermined time period, based on the target power; and adjustment unit that adjusts, within the predetermined time period, the limit value of each of the units of power consumption for the predetermined time period, based on an actual result of power usage within the predetermined time period.

A computer having installed therein the program can control power usage of a group including a plurality of units of power consumption such that control for each unit of power consumption is adjusted in accordance with the use of power by each individual unit of power consumption over each time period to reduce unused power in the entire group.

BRIEF DESCRIPTION OF DRAWINGS

FIG. 6 includes diagrams illustrating an example of predicted power usage of one consumer, in which FIG. 6(A) is a diagram illustrating an example of actual results of power usage in the past, FIG. 6(B) is a diagram illustrating prediction results of power usage over a day, and FIG. 6(C) is a diagram illustrating an example of predicted values for respective time periods in the prediction results.

FIG. 7 includes diagrams illustrating an example of adding up predicted power usage of a group including a plurality of consumers, in which FIG. 7(A) is a diagram illustrating example predictions for the respective consumers included in the group, FIG. 7(B) is a diagram illustrating prediction results of the entire group, and FIG. 7(C) is a diagram illustrating an example of predicted values for respective time periods in the prediction results of the group.

FIG. 8 includes diagrams illustrating an example of limit values set for respective consumers included in a group, in which FIG. 8(A) is a diagram illustrating an example of prediction of average power used by the group per time period, FIG. 8(B) is a diagram illustrating a result of allocation of limit values to the consumers included in the group, and FIG. 8(C) is a diagram illustrating an example of limit values allocated to one of the consumers included in the group for the respective time periods.

DESCRIPTION OF EMBODIMENTS

An embodiment will be described in detail hereinafter with reference to the accompanying drawings.

<System Configuration>

Figure 1:
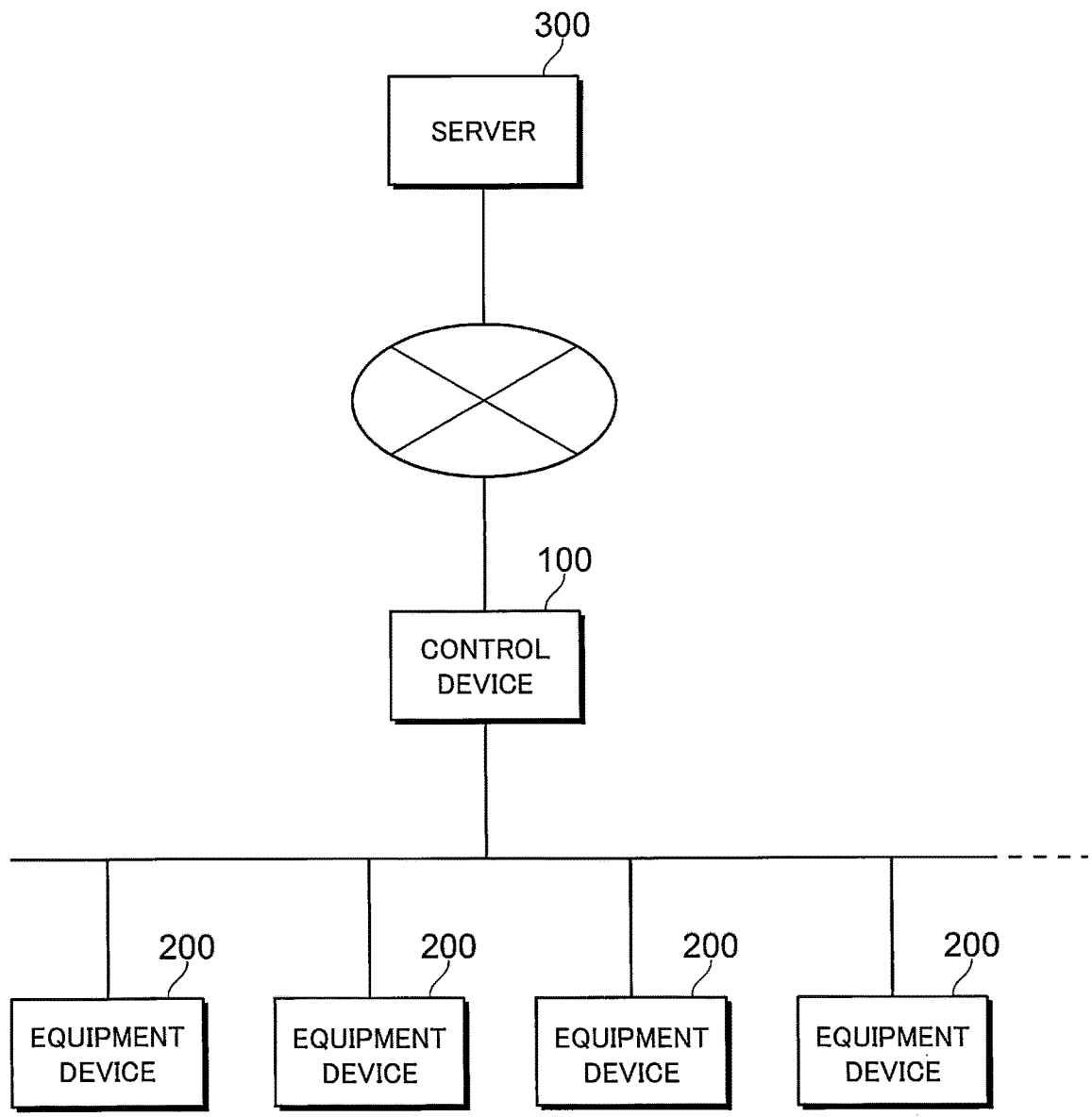
FIG. 1 is a diagram illustrating an overall configuration of a control system for equipment devices to which the present embodiment is applied.

FIG. 1 is a diagram illustrating an overall configuration of a control system for equipment devices to which the present embodiment is applied. The control system according to the present embodiment includes a control device 100, an equipment device 200 that is a device to be controlled, and a server 300. The control device 100 and the equipment device 200 are connected to each other via a network. The network may be a LAN (Local Area Network) using a dedicated line, a WAN (Wide Area Network), a VPN (Virtual Private Network) set on the Internet, or the like.

The equipment device 200 is a piece of equipment or a device that operates using power. The control device 100 controls the operation of one or more equipment devices 200. FIG. 1 illustrates an example configuration in which the control device 100 controls a plurality of equipment devices 200. The equipment devices 200 may be of any type as long as the equipment devices 200 are pieces of equipment or devices that operate using power and whose operation is controlled by the control device 100. The following description may describe an example in which the control system of the present embodiment is applied to control of an air conditioner as a specific example of the equipment devices 200.

Each of the equipment devices 200 includes a control unit that controls the equipment device 200 in accordance with an instruction from the control device 100. The control device 100 generates an instruction (hereinafter referred to as a "control instruction") for controlling the equipment devices 200 to be controlled, and transmits the generated control instruction to each of the equipment devices 200. In each equipment device 200, the control instruction is acquired from the control device 100, and the control unit of the equipment device 200 performs setting of the equipment device 200 in accordance with the acquired control instruction and controls the operation.

The control device 100 and the server 300 are connected to each other via a network. In the example configuration illustrated in FIG. 1, one control device 100 connected to the server 300 is illustrated. In actuality, a plurality of control devices 100 are connected to the server 300. Each control device 100 is connected to one or more equipment devices 200. The control device 100 and the server 300 are connected to each other via a network, examples of which include the Internet. A LAN or a WAN may be used instead.

<Relationship Between Electricity Charges and Control of Equipment Devices 200>

Electricity charges will now be described. Electricity charges mainly include a base charge and a volume charge, and are specified on a monthly basis. Calculation of the base charge is based on the base charge unit price and the contract power. The contract power is set as the largest value of the maximum power demand over the past one year from the current month. The maximum power demand is the maximum value of monthly average power used per time period (demand time period: 30 minutes). The average power used is an average value of power demand (power usage) over each time period. Calculation of the volume charge is based on the volume charge unit price and the amount of power used per month.

As described above, the contract power is the largest value of the maximum power demand over the past one year. Accordingly, when the maximum power demand over a certain month (in other words, the average power used over a certain time period in the month) is the contract power, the base charge based on the contract power is charged over one year even if the maximum power demand is kept lower than the contract power after the month. When the average power used over a certain time period exceeds the value of the contract power so far and becomes equal to the maximum power demand for the month including the time period, the average power used (maximum power demand) over the time period is used as new contract power for the calculation of the base charge thereafter.

The volume charge unit price is set in various ways. The volume charge unit price may be set to vary under a predetermined condition. For example, the volume charge unit price may be set to vary by time of day, by weekday or weekend, by season, or the like. Due to the trading of electric power in the market, the volume charge unit price may be set to vary to reflect the trading price of electric power in the market.

The equipment devices 200 may be controlled for a reduction in electricity charges required for the operation of the equipment devices 200. In this case, it is demanded to control the equipment devices 200 so that the average power used does not exceed the current contract power. In a case where the volume charge unit price varies, it is more efficient to reduce the amount of power used in a high-unit-price time period than to reduce the amount of power used in a low-unit-price time period, in terms of reduction in electricity charges. However, the volume charge unit price affects only the volume charge per time period, whereas the contract power affects the electricity charges for one year after the current month. Accordingly, control that takes into account average power used is given priority over control that takes into account fluctuations in volume charge unit price.

Electricity charges are charged to the subscribers supplied with electricity. In the present embodiment, the subscribers supplied with electricity are assumed to be a group including a plurality of consumers. Accordingly, the average power used is obtained as a total value of average power used by the plurality of consumers included in the group over each time period. The base charge is determined based on the maximum power demand (maximum value of monthly average power used per time period) per group.

The maximum power demand per group is usually less than the total sum of the maximum power demands of the consumers included in the group. This is because the time period in which the maximum power demand is obtained is generally different among the consumers included in the group. Thus, the base charge set for the group is lower than the total sum of the base charges set for the consumers included in the group in accordance with the respective maximum power demands.

Each group is assigned one or more control devices 100. The one or more control devices 100 perform control on the equipment devices 200 of the consumers included in the group in consideration of the average power used per predetermined unit time and the volume charge unit price in accordance with the electricity charges (the base charge and the volume charge) set per group.

Each consumer possesses one or more equipment devices 200, and the control device 100 controls the equipment devices 200 of one or more consumers. However, one consumer does not always correspond to one control device 100. A plurality of equipment devices 200 possessed by one consumer may be controlled by a plurality of control devices 100, or equipment devices 200 possessed by a plurality of consumers may be controlled by one control device 100. One control device 100 may be assigned to a plurality of groups. For simplicity, the following description will be given, assuming a configuration in which one control device 100 is assigned to one consumer and an equipment device 200 of each consumer is controlled by the control device 100 corresponding to each consumer.

<Configuration of Server 300>

Figure 2:
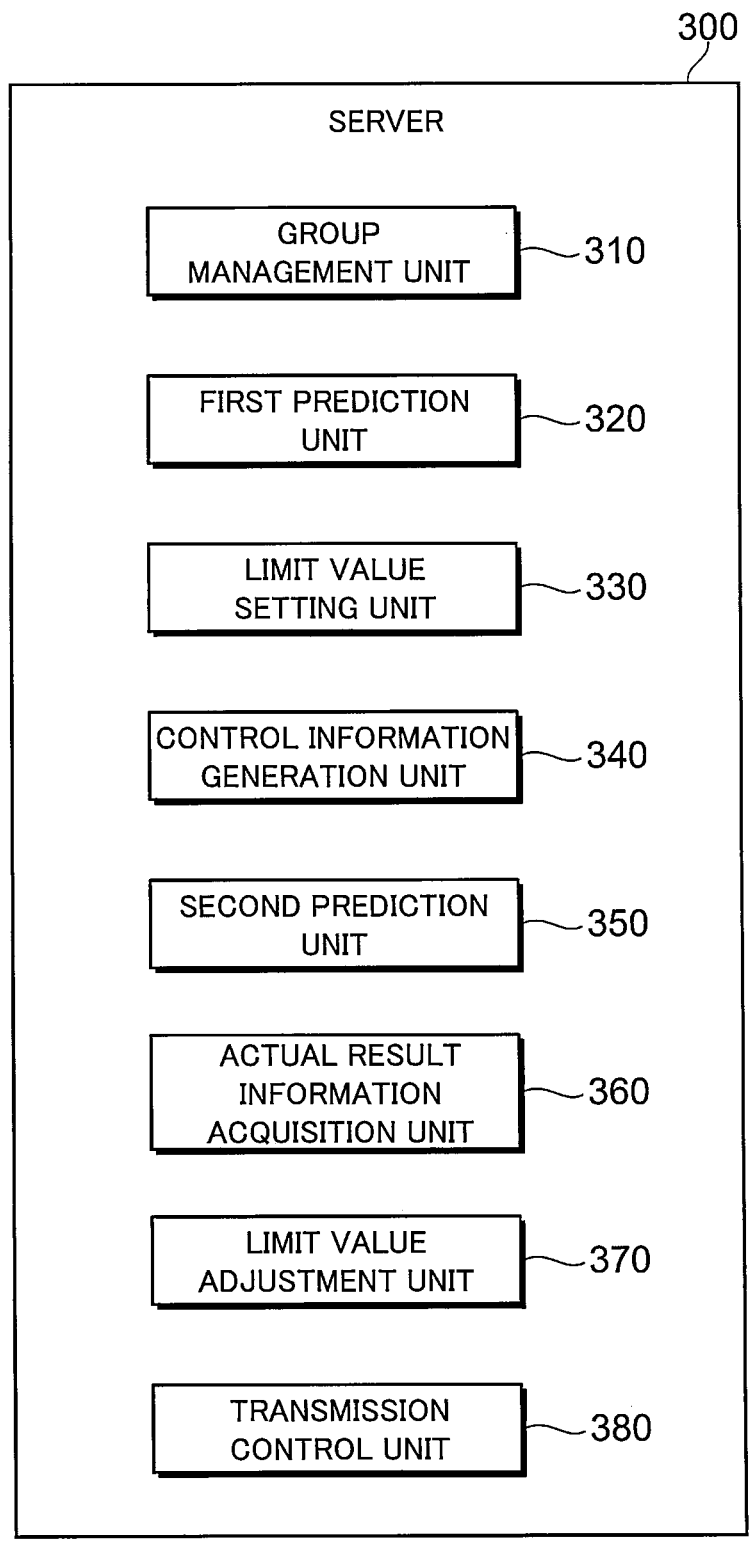
FIG. 2 is a diagram illustrating a configuration of a server.

FIG. 2 is a diagram illustrating a configuration of the server 300. The server 300 is implemented as, for example, a server (so-called cloud server) constructed on a cloud environment of a network. The server 300 includes a group management unit 310, a first prediction unit 320, a limit value setting unit 330, a control information generation unit 340, a second prediction unit 350, an actual result information acquisition unit 360, a limit value adjustment unit 370, and a transmission control unit 380.

The group management unit 310 manages the group of consumers described above. As described above, the group is set as a unit of power contract. The group management unit 310 acquires and holds information on the contract power, the maximum power demand, and the average power used per time period of the group. The group management unit 310 further manages the consumers included in the group. The group management unit 310 acquires and holds information on the contract power, the maximum power demand, and the average power used per time period of each of the consumers included in the group. The information on the average power used by each consumer is obtained from, for example, the control device 100 that controls the equipment devices 200 of each consumer. The information on the average power used by the group is obtained from, for example, the control device 100 that controls the equipment devices 200 of the consumers included in the group (hereinafter referred to as "equipment devices 200 of the group"). Specifically, for example, total average power used by each consumer included in the group over each time period is set as the average power used by the group.

The first prediction unit 320 predicts, for each of the consumers included in the group, the average power used by the equipment devices 200 of the consumer over each time period. The first prediction unit 320 is an example of a prediction unit. The average power used over each time period is predicted by the first prediction unit 320, based on, for example, history information regarding the operation of the equipment device 200 of each consumer in the group in the past. The history information regarding the operation includes a wide variety of information related to the operation of the equipment devices 200, such as information on the operating environment of the equipment devices 200, as well as information on the operating state of the equipment devices 200. The information on the operating state of the equipment devices 200 includes, for example, information such as the operating rate, the continuous operating time, and the number of times of operation. The information on the operating environment includes, for example, weather conditions such as weather, temperature, and humidity, and information such as a month, a day, and a time of day.

The average power used over a specific time period of a specific date and time (hereinafter referred to as "specific time period") may be predicted based on the average power used by the equipment device 200 over a reference time period relative to the specific time period. The reference time period is set based on, for example, history information regarding operation. The reference time period may be, for example, a past time period in which weather conditions are similar to weather conditions expected at the date and time to which the specific time period corresponds, or a corresponding time period of the same day of the same month a year ago. Alternatively, the average power used by the equipment device 200 over the specific time period may be predicted in consideration of the average power used by the equipment device 200 over time periods before and after the reference time period, the transition of the average power used by the equipment device 200 over time periods of several days until the day including the reference time period, or the like.

The limit value setting unit 330 sets, for each of the consumers included in the group, a limit value for the average power used by the equipment devices 200 of the consumer over each time period, based on the result predicted by the first prediction unit 320. The limit value setting unit 330 is an example of a setting unit. If the average power used by the group exceeds the contract power of the group, the average power used is set as new contract power, resulting in an increase in the base charge of the electricity charges. Accordingly, it is demanded to set, for the group, target power based on the contract power and to perform control such that the average power used by the entire equipment devices 200 of the group over each time period does not exceed the target power. Further, the limit value for each time period is set for each consumer such that the total value of the limit values of the consumers is equal to or less than a threshold based on the target power. The target power is set to a value equal to or less than the contract power, for example, to a value lower than the contract power by a certain value. The threshold is set to a value equal to or less than the target power, for example, a value lower than the target power by a certain value.

Figure 9:
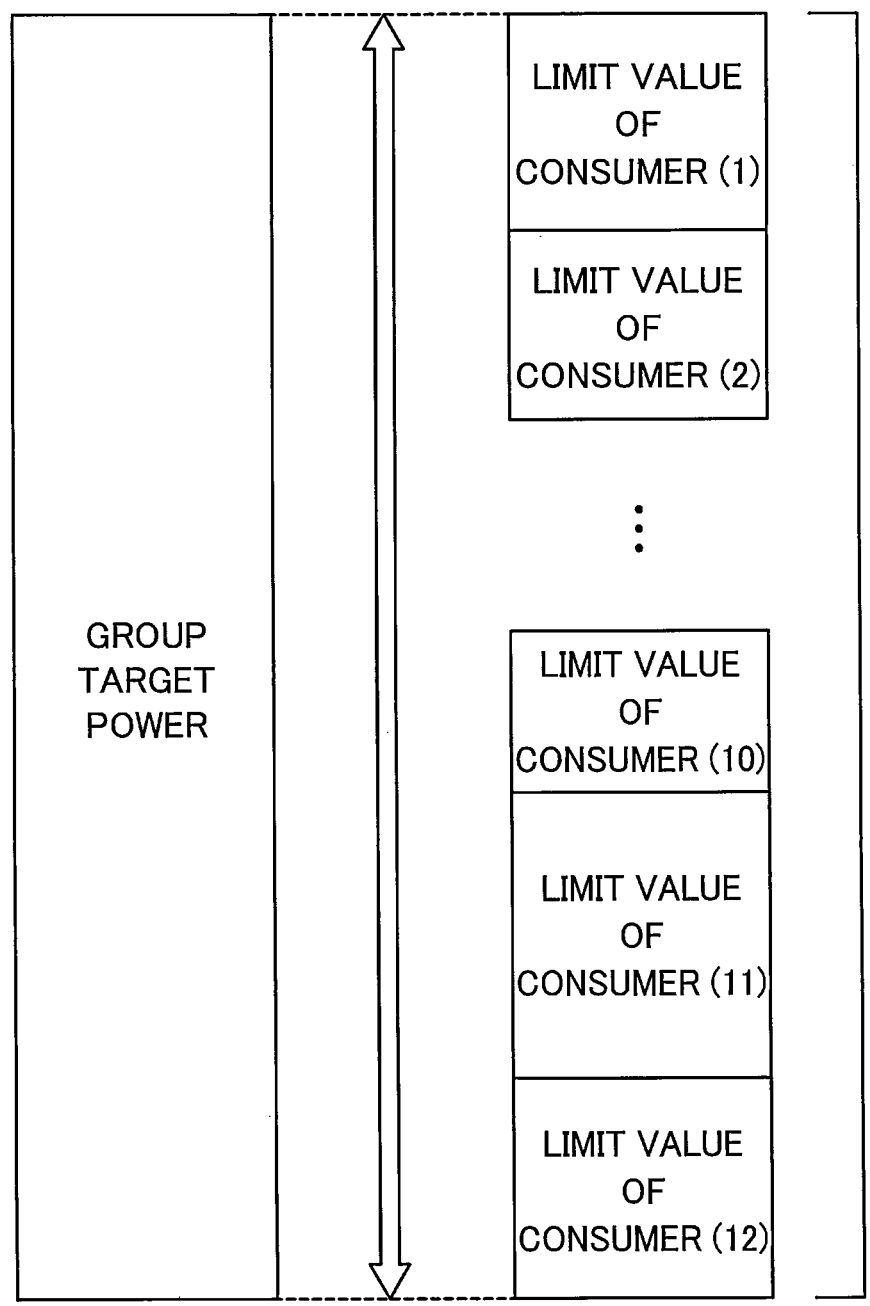
FIG. 9 is a diagram illustrating a relationship between target power of a group and a limit value of each of consumers included in the group.

FIG. 9 is a diagram illustrating a relationship between target power of a group and a limit value of each of consumers included in the group. It is assumed that the value of the target power is equal to the threshold described above, which is compared with the total value of the limit values of the consumers. The example illustrated in FIG. 9 indicates that the value obtained by totaling the limit values of 12 consumers (consumer (1) to consumer (12)) does not exceed the target power of the group including the consumers. As illustrated in FIG. 9, in the present embodiment, the power corresponding to the target power set for the group is allocated to the consumers included in the group. In this configuration, each of the consumers included in the group is an example of a unit of power consumption.

The limit value of each of the consumers included in the group is set based on, for example, prediction of the average power used by the consumer, which is performed by the first prediction unit 320. From the prediction by the first prediction unit 320, the predicted proportion of the average power used by each consumer in the group is identified for each time period. For example, in a case where the total value of the limit values of the consumers is set to be equal to the threshold based on the target power described above, the average power used corresponding to the threshold is divided according to the proportions of the average power used by the respective consumers, which are predicted by the first prediction unit 320, to determine the limit values of the respective consumers. In other words, the limit value means the power usage available to each consumer for the time period.

Alternatively, the limit value may be set based on the actual value of the average power used per consumer per time period in a past specific period, instead of based on the proportion of the average power used per consumer predicted for each time period. For example, the proportion of the actual value of the average power used by each consumer over the reference time period described in the description of the prediction by the first prediction unit 320 to the specific time period described in the same description is identified. The proportion of the actual value may be used to set the limit value of each consumer for the specific time period. The specific period is determined in accordance with the amount of information obtained as the actual value of the reference time period. The specific period may be set as, for example, the past one year or several years, or a period from a specific month and day to a specific month and day.

Alternatively, the limit value may be set based on the maximum value of the average power used per consumer per time period in the specific period. For example, it is assumed that the specific period is set as the past one year, the maximum value of the average power used per time period in the past one year can be obtained for each consumer. Then, the maximum values of the respective consumers may be compared with each other, and the limit values of the respective consumers may be set in proportions according to the ratio. In this case, unlike the use of the actual value of the reference time period, the time period in which the average power used is the maximum value may be different for each consumer.

Further, a lower limit may be set as a limit value. The lower limit is a value greater than 0. Accordingly, in the prediction by the first prediction unit 320, even when the average power used by a certain consumer over a certain time period is predicted to be 0, the limit value corresponding to the lower limit is set. Such a limit value is set to avoid inconvenience that, in a case where the limit value is set to 0 for the time period in which the average power used by a certain consumer is predicted to be 0, the limit value is exceeded immediately when the consumer uses the equipment device 200 in the time period. The average power used may be predicted to be 0 when, for example, the average power used by the consumer over the reference time period, which is used for the prediction by the first prediction unit 320, is 0.

The method for setting the lower limit may be appropriately determined in accordance with, for example, the operation or specification of the control system, or agreement within the group, between the consumers, or the like. For example, a fixed value may be determined in advance.

Alternatively, a value that varies based on a predicted value or the like of the average power used by the entire group over each time period may be used. When a fixed value is to be set as the lower limit, the same value may be set for the consumers, or a different value may be set for each consumer according to an appropriate condition or a request from the consumer. The predicted value of the average power used by the entire group per time period is obtained by adding up the predicted values of the average power used by the consumers included in the group per time period, which are obtained by the first prediction unit 320.

When a lower limit is to be set as a limit value, a lower-limit threshold may be set for the limit value, and the lower limit may be applied as the limit value when the limit value assigned to a certain consumer falls below the lower-limit threshold. A value different from the lower limit may be set as the lower-limit threshold. For example, a value lower than the lower limit is set as the lower-limit threshold, when the limit value assigned to a certain consumer falls below the lower-limit threshold in a certain time period, the lower limit, which is higher than the lower-limit threshold, is set as the limit value of the consumer for the time period.

When the lower limit described above is set as a limit value, a limit value different from (larger than) the value based on the proportion specified by the limit value setting method described above is assigned to some of the consumers included in the group. Accordingly, if the value given as the lower limit is simply added to the value calculated by the proportion according to the setting method described above to set the limit value of each consumer, the total value of the limit values of the respective consumers may exceed the threshold based on the target power described above. It is therefore desirable to perform correction such that, if there is a consumer for which the lower limit is applied to the limit value, the total value of the limit values of the respective consumers that take into account the lower limit does not exceed the threshold. It is conceivable to set the limit value of each consumer such that, for example, a value obtained by adding together the value calculated by the proportion according to the setting method described above and the applied lower limit is equal to or less than the threshold described above. It is also conceivable to subtract the total of the applied lower limits from the limit value of the consumer to which the lower limit is not applied.

A description has been made that a limit value is set for the average power used by an equipment device 200 of each consumer over each time period. Alternatively, a configuration may be used in which a limit value is set only for the average power used over a time period satisfying a specific condition. For example, the predicted values of the average power used by the consumers included in the group over a certain time period, which are obtained by the first prediction unit 320, are added up to obtain the predicted value of the average power used by the entire group for the certain time period. A limit value may be set only for the average power used over such a time period on condition that the predicted value of the average power used by the group exceeds the threshold.

In contrast, consideration will be given to a case where the predicted value of the average power used by the group falls below the threshold described above. The threshold is set based on the target power, and the target power is set based on the contract power. For this reason, if many consumers in the group do not use large power during a certain time period (e.g., a time period from midnight to dawn), the predicted value of the average power used by the group during the time period is considered to fall significantly below the threshold. In this case, the limit value of each of the consumers included in the group may be set to a value higher than the predicted value of the average power used by the consumer within a range in which the total value of the limit values of the respective consumers does not exceed the threshold.

The control information generation unit 340 generates control information for controlling an equipment device 200 of each of the consumers included in the group. The control information is information for causing the control device 100 to control the equipment devices 200 so that the average power used by the equipment devices 200 of the consumer over each time period does not exceed the limit value of the consumer for the time period, which is set by the limit value setting unit 330. Accordingly, the control information includes information on the limit value set by the limit value setting unit 330 for each consumer. Before the start of each time period in which control is performed using each control information, the control information generation unit 340 generates control information for the time period.

When the limit value of each consumer, which is set by the limit value setting unit 330, is adjusted by the limit value adjustment unit 370, the control information generation unit 340 generates control information for reflecting the adjustment result of the limit value in the control of the equipment devices 200. When the control information based on the limit value set by the limit value setting unit 330 and the control information based on the limit value adjusted by the limit value adjustment unit 370 are hereinafter referred to as "general control information" and "individual control information", respectively, if they are distinguished from each other. As will be described in detail below, the limit value adjustment unit 370 adjusts the limit value within a time period during which control for reflecting the adjustment of the limit value is performed. Accordingly, unlike the general control information, the individual control information is generated within a time period during which control is performed using the individual control information, after the time period starts.

In a time period during which the equipment devices 200 are currently being controlled (hereinafter referred to as a "current time period"), the second prediction unit 350 predicts the average power used by the equipment devices 200 over the current time period. The average power used is predicted by the second prediction unit 350, based on, for example, information related to the operating status of an equipment device 200 of each consumer within the current time period. The information related to the operating status includes, for example, information such as the transition of the power usage of the equipment device 200 from the start of the current time period to the time point of prediction within the time period, the amount of power used, the state of operation, and the settings related to the operation. The settings related to the operation are specifically selected in accordance with the type of the equipment device 200. For example, when the equipment device 200 is an air conditioner, information such as a difference between a set temperature and an actual room temperature can be used.

The actual result information acquisition unit 360 acquires actual result information related to the operating status of an equipment device 200 of each of the consumers included in the group. Examples of the acquired actual result information include the above-described actual result information for the current time period (actual result information from the start of the current time period to the time point at which the actual result information is acquired), and actual result information for a time period that has already ended.

The actual result information may be acquired from the control device 100 that controls the equipment device 200 or may be acquired from the equipment device 200 itself. The actual result information for the current time period, which is acquired by the actual result information acquisition unit 360, is used by the second prediction unit 350 for the prediction of the average power used by the equipment device 200, by the limit value adjustment unit 370 for the adjustment of the limit value, and so on.

The limit value adjustment unit 370 adjusts the limit values of the consumers included in the group, which are set by the limit value setting unit 330, based on a predetermined condition. As an example, the limit value adjustment unit 370 adjusts the limit value of each consumer based on the prediction by the second prediction unit 350. As another example, the limit value adjustment unit 370 adjusts the limit value of each consumer based on the actual result information related to the operating status of the equipment device 200 during the current time period, which is acquired by the actual result information acquisition unit 360. The limit values are adjusted such that the consumers included in the group interchange the power usage available to the consumers. For example, the limit values of some consumers among the consumers included in the group are decreased, and the limit values of the other consumers are increased by an amount corresponding to the decrease in the limit values of some consumers. The adjustment of the limit values will be described in detail below.

The transmission control unit 380 transmits the control information generated by the control information generation unit 340 to the control device 100 that controls the equipment device 200 of the consumer corresponding to the control information. Before the start of each time period in which control is performed using each control information, the transmission control unit 380 transmits general control information for the time period to the control device 100. The transmission control unit 380 may transmit general control information for each time period to the control device 100 such that general control information for decreasing the power usage over the time period from the power usage over the immediately preceding time period is transmitted earlier than general control information for increasing the power usage over the time period from the power usage over the immediately preceding time period.

Further, immediately after individual control information is generated, the transmission control unit 380 transmits the individual control information to the control device 100 that controls the equipment device 200 to be controlled using the generated individual control information. The transmission control unit 380 may transmit individual control information to the control device 100 such that individual control information of the equipment device 200 whose limit value is decreased by adjustment is transmitted earlier than individual control information of the equipment device 200 whose limit value is increased by adjustment.

<Configuration of Control Device 100>

Figure 3:
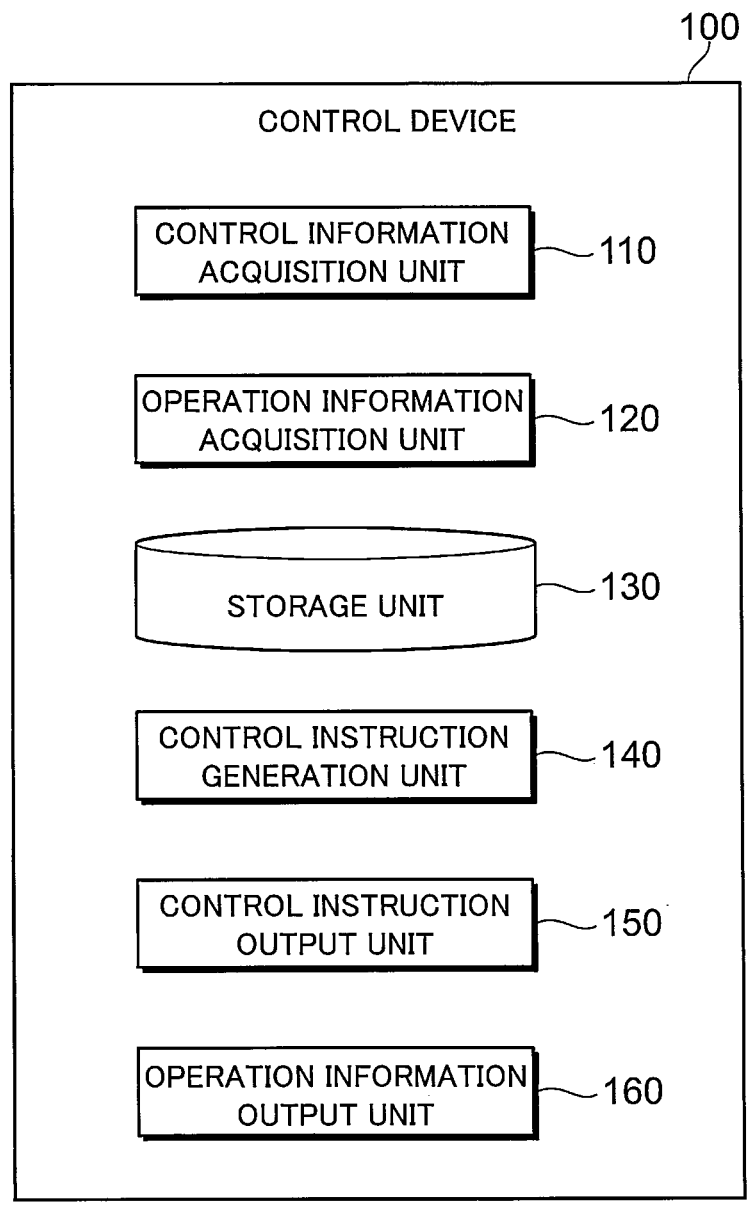
FIG. 3 is a diagram illustrating a configuration of a control device.

FIG. 3 is a diagram illustrating a configuration of the control device 100. The control device 100 is implemented as an information processing device connected to the server 300 and the equipment device 200 via a network. The control device 100 may be a device (e.g., an edge server) located close to the equipment device 200 to be controlled, or may be a server (cloud server) constructed on a cloud environment. The control device 100 includes a control information acquisition unit 110, an operation information acquisition unit 120, a storage unit 130, a control instruction generation unit 140, a control instruction output unit 150, and an operation information output unit 160.

The control information acquisition unit 110 acquires control information of the equipment device 200 from the server 300. The control information acquired by the control information acquisition unit 110 includes, as control information for a certain time period, general control information acquired before the start of the time period and individual control information acquired during the time period. The general control information includes information on a limit value of average power used that is set for each consumer. The individual control information includes information on a new limit value for adjusting the limit value included in the general control information for the current time period.

The operation information acquisition unit 120 acquires operation information of the equipment device 200 to be controlled by the control device 100. The operation information acquired by the operation information acquisition unit 120 includes a wide variety of information related to the operation of the equipment device 200. The operation information includes, for example, information indicating an operation state such as an operating rate or a continuous operating time of the equipment device 200. The operation information may include various kinds of information considered to affect the operation of the equipment device 200, such as a time of day in which the equipment device 200 is operated, and operation on weekdays or weekends. The operation information acquisition unit 120 may further acquire information on an environment in which the equipment device 200 is installed, such as temperature and humidity. These pieces of information can be acquired by various existing methods in accordance with the type of information. For example, the information may be acquired from the equipment device 200 itself or from various sensor devices or the like. Information on a date and time is obtained by, for example, a clock function or a calendar function of the control device 100.

The storage unit 130 stores various kinds of information acquired by the control information acquisition unit 110 and the operation information acquisition unit 120. The control information acquired by the control information acquisition unit 110 is used to control the equipment device 200. In the control information, the general control information for each time period is stored in the storage unit 130 before the start of the time period in which control is performed using each piece of general control information. The operation information of the equipment device 200, which is acquired by the operation information acquisition unit 120, is transmitted to the server 300 at a predetermined timing and is used for prediction by the first prediction unit 320 and the second prediction unit 350 of the server 300.

The control instruction generation unit 140 generates a control instruction for controlling the equipment device 200, based on the control information acquired by the control information acquisition unit 110. The control instruction generation unit 140 generates a control instruction for operating the equipment device 200 so that the average power used by an equipment device 200 of each consumer over each time period does not exceed the limit value set for the consumer for the time period. When a consumer has a plurality of equipment devices 200, a control instruction is generated for each time period so that the total value of average power used by all of the equipment devices 200 of the consumer does not exceed the limit value for the corresponding time period. In this case, the method by which the consumer allocates power to the plurality of equipment devices 200 thereof so that the limit value set for the consumer is not exceeded is not particularly limited. For example, power may be equally allocated according to the types, device scales, or the like of the equipment devices 200. Alternatively, a specific equipment device 200 may be allocated sufficient power, and the remaining power may be allocated to the other equipment devices 200. Alternatively, in a certain time period, some of the equipment devices 200 are not operated, and only other equipment devices 200 may use power. Alternatively, the control instruction generation unit 140 may generate a control instruction in consideration of the operation information of the equipment devices 200 acquired by the operation information acquisition unit 120. In the control information acquired by the control information acquisition unit 110, the control instruction generated by the control instruction generation unit 140 based on the general control information is held in the storage unit 130.

The control instruction output unit 150 reads the control instruction generated by the control instruction generation unit 140 based on the general control information in the control information acquired by the control information acquisition unit 110 from the storage unit 130 during a time period in which control is performed using the general control information, and transmits the control instruction to the equipment device 200 to be controlled. Further, the control instruction output unit 150 immediately transmits the control instruction generated by the control instruction generation unit 140 based on the individual control information in the control information acquired by the control information acquisition unit 110 to the equipment device 200 to be controlled.

The operation information output unit 160 reads the operation information of the equipment device 200, which is acquired by the operation information acquisition unit 120 and held in the storage unit 130, from the storage unit 130 in accordance with a predetermined condition, and transmits the operation information to the server 300. The operation information may be read and transmitted in response to a request from the server 300 or may be read and transmitted periodically at a predetermined time of a day or the like.

<Hardware Configuration of Control Device 100 and Server 300>

Figure 4:
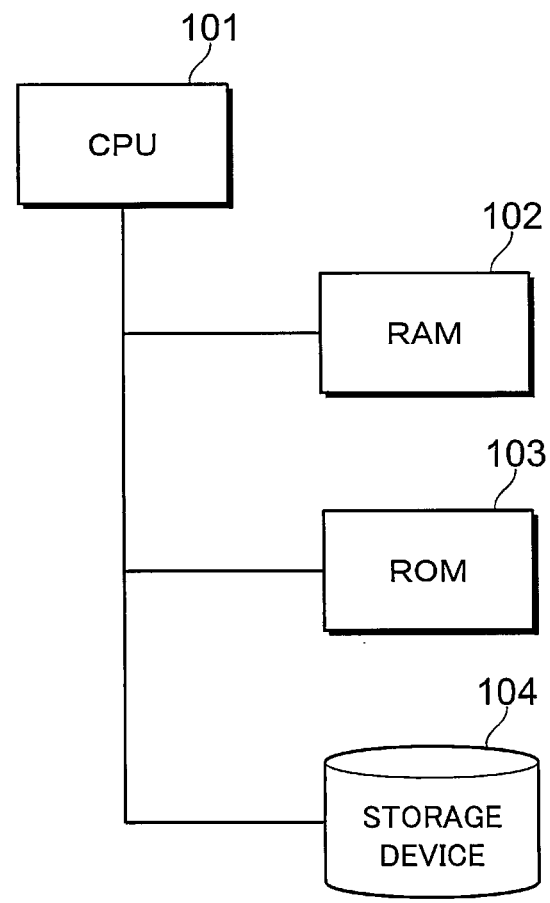
FIG. 4 is a diagram illustrating an example hardware configuration of the control device and the server.

FIG. 4 is a diagram illustrating an example hardware configuration of the control device 100 and the server 300. The control device 100 and the server 300 are implemented by a computer, for example. The control device 100 and the server 300 may be implemented as servers constructed in a cloud environment. Even in this case, the control device 100 and the server 300 are configured as virtual systems using system resources of physical computers, as illustrated in FIG. 4, on a network.

The computer that implements the control device 100 includes an arithmetic unit, namely, a CPU (Central Processing Unit) 101, and storage unit, namely, a RAM (Random Access Memory) 102, a ROM (Read Only Memory) 103, and a storage device 104. The RAM 102 is a main storage device (main memory) and is used as a working memory for the CPU 101 to perform arithmetic processing. The ROM 103 holds programs and data such as set values prepared in advance. The CPU 101 can directly read the programs and the data from the ROM 103 to execute processing. The storage device 104 is a unit for storing programs and data. The storage device 104 stores a program. The CPU 101 reads the program stored in the storage device 104 into the main storage device and executes the program. The storage device 104 further stores and saves a result of processing by the CPU 101. Examples of the storage device 104 include a magnetic disk device and an SSD (Solid State Drive).

When the control device 100 is implemented by the computer illustrated in FIG. 4, the functions of the control information acquisition unit 110, the operation information acquisition unit 120, the control instruction generation unit 140, the control instruction output unit 150, and the operation information output unit 160 described with reference to FIG. 3 are implemented by, for example, the CPU 101 executing a program. The storage unit 130 is implemented by the RAM 102 or the storage device 104, for example. When the server 300 is implemented by the computer illustrated in FIG. 4, the functions of the group management unit 310, the first prediction unit 320, the limit value setting unit 330, the control information generation unit 340, the second prediction unit 350, the actual result information acquisition unit 360, the limit value adjustment unit 370, and the transmission control unit 380 described with reference to FIG. 2 are implemented by, for example, the CPU 101 executing a program. The example configuration illustrated in FIG. 4 is merely an example in which the control device 100 is implemented by a computer.

<Configuration of Equipment Device 200>

Figure 5:
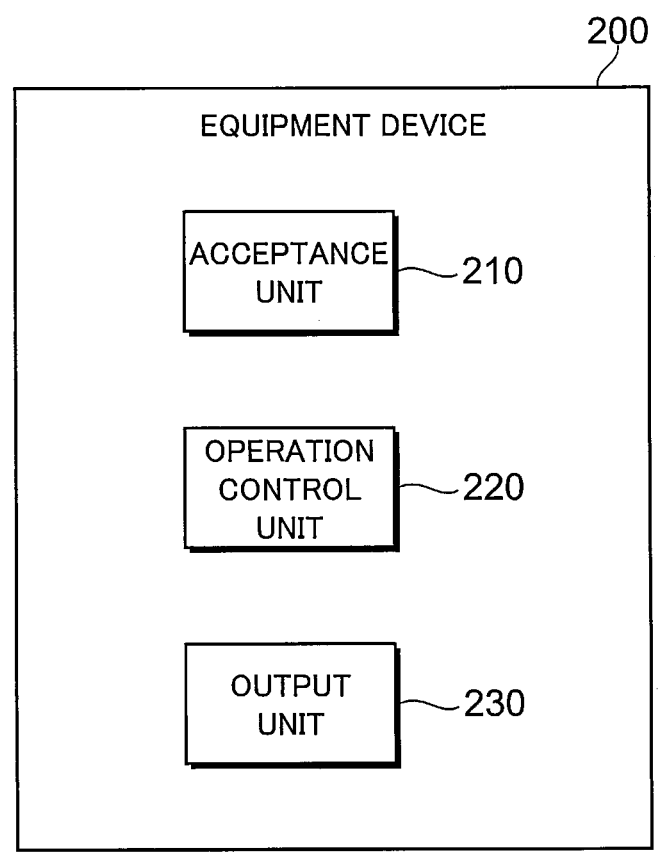
FIG. 5 is a diagram illustrating a configuration of an equipment device.

FIG. 5 is a diagram illustrating a configuration of the equipment device 200. The equipment device 200 includes an acceptance unit 210, an operation control unit 220, and an output unit 230. The equipment device 200 includes a mechanism or a device that operates to implement the functions of the equipment device 200 in accordance with the type. For example, when the equipment device 200 is an air conditioner, the equipment device 200 includes an indoor unit, an outdoor unit, and the like. When the equipment device 200 is a piece of lighting equipment, the equipment device 200 includes a lighting fixture, a control switch, and the like. Such mechanisms and the like have various types and modes that vary depending on the type of the equipment device 200, and the types and modes are not illustrated.

The acceptance unit 210 accepts a control instruction, which is output from the control device 100, via a network by using a network interface (not illustrated).

The operation control unit 220 controls the operation of a mechanism or a device disposed in the equipment device 200 in accordance with the control instruction accepted by the acceptance unit 210. Specifically, for example, when the equipment device 200 is an air conditioner, the acceptance unit 210 accepts information specifying a set temperature as a control instruction, and the operation control unit 220 controls the operation of the indoor unit and the outdoor unit so that the accepted set temperature is achieved. While an example of control related to temperature setting has been given, control based on a control instruction by the operation control unit 220 can be applied to various types of control (e.g., control of humidity or gas components) related to gas that can be controlled by the air conditioner. Also in any equipment device 200 other than the air conditioner, the operation control unit 220 executes control corresponding to the type of the equipment device 200 in accordance with the control instruction accepted from the control device 100.

The output unit 230 outputs information related to the operation state of the equipment device 200 to the control device 100 via a network by using the network interface (not illustrated).

The acceptance unit 210, the operation control unit 220, and the output unit 230 are implemented by a computer, for example. The computer that implements the operation control unit 220 may have the configuration described with reference to FIG. 4. In this case, the respective functions of the acceptance unit 210, the operation control unit 220, and the output unit 230 are implemented by, for example, the CPU 101 illustrated in FIG. 4 executing a program. The respective functions of the acceptance unit 210, the operation control unit 220, and the output unit 230 may be implemented by dedicated hardware. The functions may be implemented by, for example, an ASIC (Application Specific Integrated Circuit), an FPGA (Field-Programmable Gate Array), or any other circuit. A function implemented by the CPU 101 executing a program (software) and a function implemented by dedicated hardware may be combined to implement the acceptance unit 210, the operation control unit 220, and the output unit 230.

<Example of Set Limit Values>

In the present embodiment, a group including a plurality of consumers is a contract target, and contract power is set based on average power used per group per time period. The average power used per group per time period will further be described with reference to the drawings.

FIG. 6 includes diagrams illustrating an example of predicted power usage of one consumer. FIG. 6(A) is a diagram illustrating an example of actual results of power usage in the past, FIG. 6(B) is a diagram illustrating prediction results of power usage over a day, and FIG. 6(C) is a diagram illustrating an example of predicted values for respective time periods in the prediction results. In the graphs in FIGS. 6(A) and 6(B), the horizontal axis represents time periods (48 time periods) of a day (24 hours), and the vertical axis represents average power (kW) used per time period. The graphs in FIGS. 6(A) and 6(B) and the tables in FIG. 6(C) present the actual results and prediction results of average power used by the equipment devices 200 over the respective time periods of a day. Further, FIGS. 6(A) to 6(C) illustrate, for the equipment devices 200 of one consumer, the actual results and the prediction results of the entire equipment devices 200 possessed by the consumer and the actual results and the prediction results of the air conditioner among the equipment devices 200.

FIG. 6(A) illustrates the actual results of the average power used per time period of three days before (three days before, two days before, and one day before) the day on which the power usage is to be predicted. In the drawings, a graph with a light color indicates the actual results of the entire equipment devices 200, and a graph with a dark color indicates the actual results of the air conditioner. FIG. 6(B) illustrates an example of prediction results of average power used per time period, which are predicted in consideration of the actual results illustrated in FIG. 6(A). Also in FIG. 6(B), as in FIG. 6(A), a graph with a light color indicates the prediction results of the entire equipment devices 200, and a graph with a dark color indicates the prediction results of the air conditioner. In FIG. 6(C), the predicted values of the average power used by the entire equipment devices 200 (in the drawing, illustrated as "building" representing a facility in which the equipment devices 200 are installed) over the respective time periods (the first time period to the 48th time period) of a day and the predicted values of the average power used by the air conditioner among the equipment devices 200 are illustrated in association with each other.

FIG. 7 includes diagrams illustrating an example of adding up predicted power usage of a group including a plurality of consumers. FIG. 7(A) is a diagram illustrating example predictions for the respective consumers included in the group, FIG. 7(B) is a diagram illustrating prediction results of the entire group, and FIG. 7(C) is a diagram illustrating an example of predicted values for respective time periods in the prediction results of the group. In the graphs in FIGS. 7(A) and 7(B), the horizontal axis represents time periods (48 time periods) of a day (24 hours), and the vertical axis represents average power (kW) used per time period. The graphs in FIGS. 7(A) and 7(B) and the tables in FIG. 7(C) present the prediction results of average power used by the consumers and the group over the respective time periods of a day. The prediction results of average power used by the entire equipment devices 200 of each consumer are referred to as prediction results of average power used by the consumer or prediction results of the consumer.

FIG. 7(A) illustrates prediction results of average power used per consumer in the group per time period. In FIG. 7(A), only the prediction results of three consumers (consumers (1) to (3)) among the plurality of consumers included in the group are illustrated, and the prediction results of the others are omitted. In FIG. 7(A), a graph with a light color indicates the prediction results of the entire equipment devices 200, and a graph with a dark color indicates the prediction results of the air conditioner. FIG. 7(B) illustrates prediction results of average power used by the entire group including the three consumers illustrated in FIG. 7(A) over the respective time periods. In FIG. 7(B), segments (colors) of the graph for each time period indicate that the predicted values of the average power used by the consumers included in the group are added up for the corresponding time period. FIG. 7(C) illustrates total values of the prediction results of average power used per consumer over the respective time periods (the first time period to the 48th time period) of a day.

It is assumed that the group has a target power (denoted by "target value" in the drawing) of 1000 kW. Referring to FIGS. 7(B) and 7(C), the predicted values of the average power used by the entire group over the 22nd time period to the 31st time period exceed the target power. Accordingly, the limit value for the power usage of each of the consumers included in the group is set such that, during at least these time periods, the predicted values of the average power used by the entire group do not exceed the target power. The limit value itself of each consumer may be set not only for a time period in which the predicted value of the entire group exceeds the target power but also for another time period in which the predicted value of the entire group does not exceed the target power.

FIG. 8 includes diagrams illustrating an example of limit values set for respective consumers included in a group. FIG. 8(A) is a diagram illustrating an example of prediction of average power used by the group per time period, FIG. 8(B) is a diagram illustrating a result of allocation of limit values to the consumers included in the group, and FIG. 8(C) is a diagram illustrating an example of limit values allocated to one of the consumers included in the group for the respective time periods. In the graphs in FIGS. 8(A) and 8(B), the horizontal axis represents time periods (48 time periods) of a day (24 hours), and the vertical axis represents average power (kW) used per time period.

FIG. 8(A) illustrates prediction results of average power used per consumer in the group per time period. The illustrated graph is the same as the graph illustrated in FIG. 7(B). FIG. 8(B) illustrates an example of the result of allocation of limit values set for the consumers included in the group when the average power used by the group for each time period is made equal to the target power. In FIG. 8(B), segments (colors) of the graph for each time period indicate the proportions of the limit values allocated to the respective consumers (power usage available to the consumers) for the corresponding time period. In principle, the proportions of the limit values allocated to the respective consumers for each time period are the proportions of the predicted values of the average power used by the respective consumers in the prediction of the average power used by the group illustrated in FIG. 8(A). Depending on the predicted value of each consumer, a lower limit, instead of the proportion of the predicted value of the average power used, may be assigned as the limit value. FIG. 8(C) illustrates the limit values for the respective time periods (the first time period to the 48th time period) of a day, which are allocated to one consumer (consumer (1)) among the consumers included in the group.

<Example of Adjustment of Limit Values>

In the present embodiment, a limit value for the average power used by each consumer in the group is set, for each time period in which the equipment device 200 of the consumer is controlled, before the time period starts. Such a limit value is used to control the equipment device 200 of each consumer. When the time period starts, the limit value of each consumer is adjusted as necessary, and the control of the equipment device 200 in the time period is changed. The adjustment of the limit value will further be described with reference to the drawings. In the following example, a case will be described in which the value of the target power and the threshold based on the target power are equal to each other and in which the total value of the limit values of the consumers included in the group is controlled to be equal to or less than the target power of the group.

Figure 10:
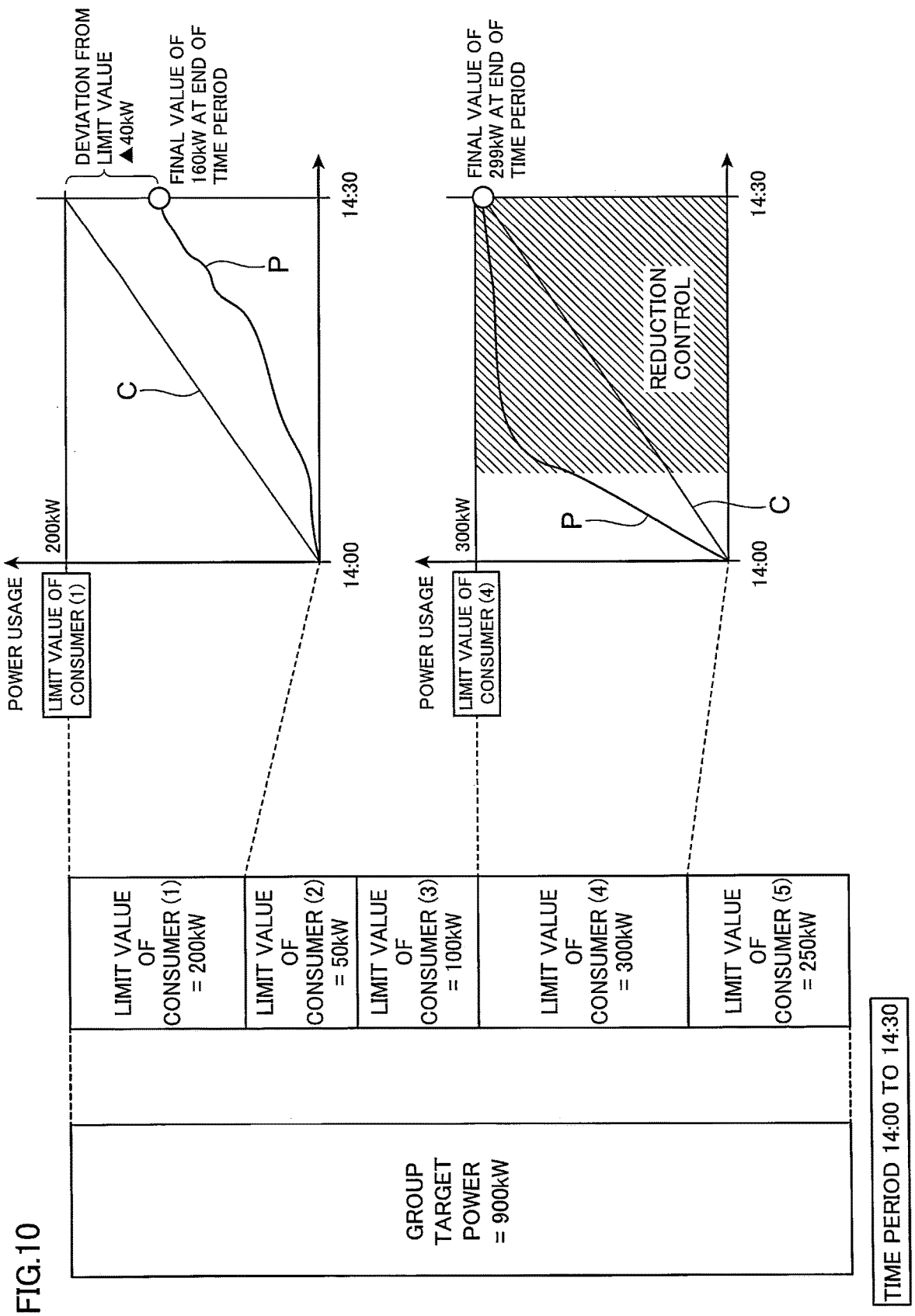
FIG. 10 is a diagram illustrating a relationship between limit values of consumers for a certain time period and actual results of power usage by consumers.

FIG. 10 is a diagram illustrating a relationship between limit values of consumers for a certain time period and actual results of power usage by consumers. In the example illustrated in FIG. 10, five consumers (consumer (1) to consumer (5)) are included in a group. In the example illustrated in FIG. 10, the target power of the group for a certain time period (time period of 14:00 to 14:30 in the drawing) is 900 kW, the limit value of the consumer (1) is set to 200 kW, the limit value of the consumer (2) is set to 50 kW, the limit value of the consumer (3) is set to 100 kW, the limit value of the consumer (4) is set to 300 kW, and the limit value of the consumer (5) is set to 250 kW.

When the time period described above starts and each consumer actually uses power, the power actually used may deviate from that predicted by the first prediction unit 320 of the server 300 before the start of the time period due to the operating status or environment of the equipment device 200. FIG. 10 presents a graph illustrating an example of actual results of power usage of the consumer (1) and the consumer (4) among the consumers included in the group. In the graphs, the horizontal axis represents the time period (30 minutes), and the vertical axis represents the average power used over the time period, which is estimated from the actual results of power demand up to the respective time points over time. In the graphs, the power usage over one time period is indicated by a line reaching the value of the average power used, at the end of the time period. In the graphs, the power usage is indicated by a straight line when the power usage is constant over one time period. The angle of the straight line decreases as the average power used over the time period decreases. The angle of the straight line increases as the average power used over the time period increases. Each of the graphs of the consumer (1) and the consumer (4) illustrates a straight line C reaching the limit value of each consumer at the end of the time period, and a curve P representing the actual values.

In the example illustrated in FIG. 10, the consumer (1) has a limit value of 200 kW for the time period (14:00 to 14:30). Accordingly, the straight line C in the graph of the consumer (1) is a straight line reaching 200 kW at the end (14:30) of the time period. The actual power demand of the consumer (1) illustrated in FIG. 10 is smaller than the average power used corresponding to the limit value. Thus, the curve P of the actual values deviates downward from the straight line C. The value (final value) of the average power used over this time period specified at the end (14:30) of the time period is 160 kW. Accordingly, the actual value of the average power used by the consumer (1) over this time period is lower than the limit value by 40 kW. Referring to the graph of the consumer (1) in FIG. 10, the final value deviates downward from the limit value.

In the example illustrated in FIG. 10, the consumer (4) has a limit value of 300 kW for the time period (14:00 to 14:30). Accordingly, the straight line C in the graph of the consumer (4) is a straight line reaching 300 kW at the end (14:30) of the time period. The actual power demand of the consumer (4) illustrated in FIG. 10 is larger than the average power used corresponding to the limit value in the initial stage of the time period. Thus, the curve P of the actual value deviates upward from the straight line C. If the operating state of the equipment device 200 of the consumer (4) remains unchanged, the average power used over this time period exceeds the limit value of the consumer (4). Accordingly, control (reduction control) for reducing the power usage of the equipment device 200 of the consumer (4) is performed from the middle of the time period. In the graph of the consumer (4) in FIG. 10, a hatched portion is a time period during which the reduction control is performed. As a result, the power usage of the consumer (4) decreases, and the curve P of the actual values approaches the straight line C. The final value of the average power used is 299 kW, which is equal to or less than the limit value.

In the example described above, the actual results of the power usage of the consumer (1) and the consumer (4) among the consumers included in the group have been described. However, a similar deviation from the limit values may occur for the average power used by the consumers. As described with reference to FIG. 10, the reduction control for the equipment device 200 is performed when the power usage in the middle of the time period exceeds the limit value. As a result, the final value of the average power used over the time period is normally equal to or less than the limit value. When the power usage in the middle of the time period is lower than the limit value, in contrast, the final value of the average power used over the time period deviates downward from the limit value. In the entire group, a value obtained by totaling the deviation values between the actual results of the average power used by the consumers and the limit values represents the deviation from the target power of the group.

Figure 11:
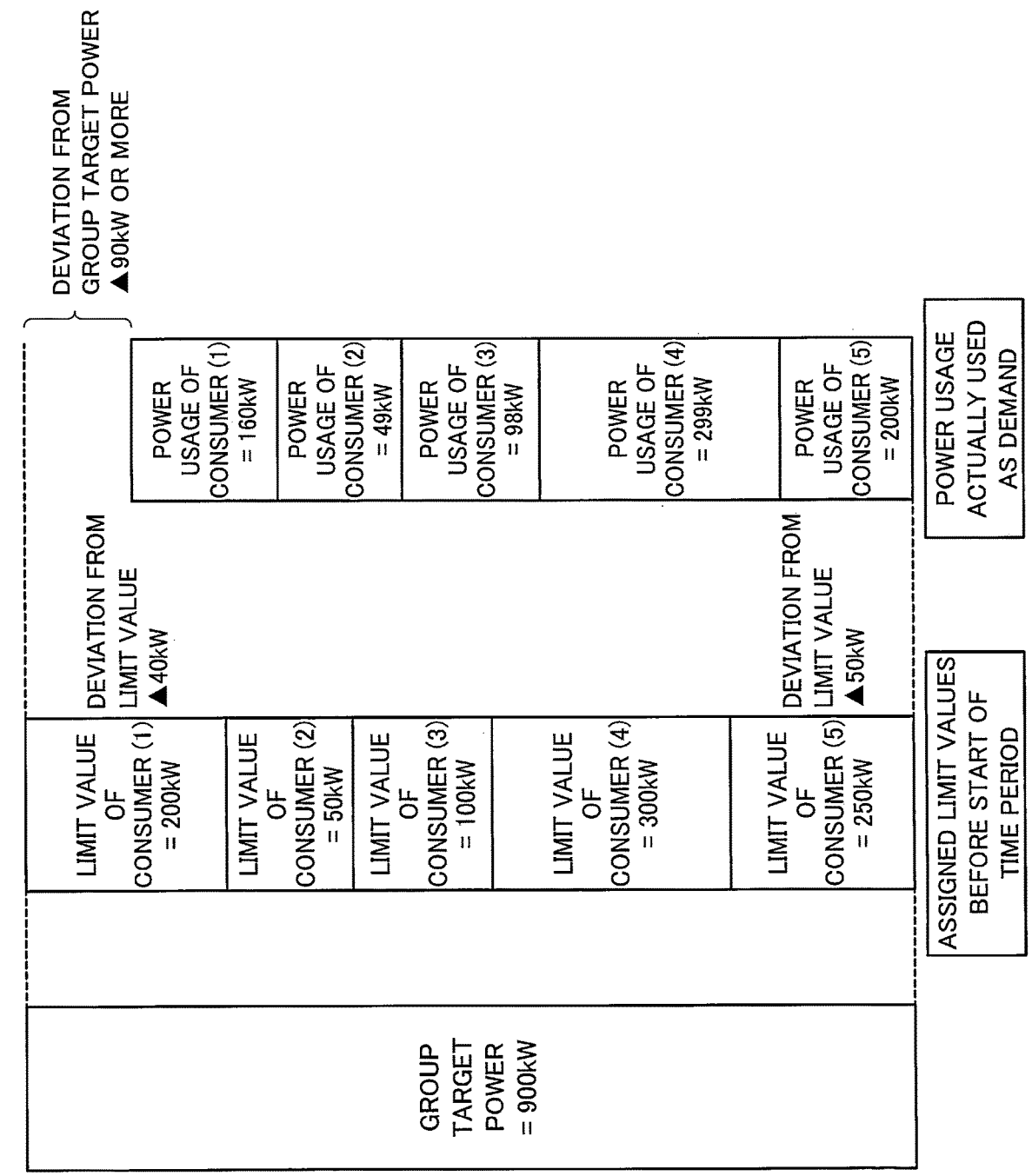
FIG. 11 is a diagram illustrating an example of the difference between the target power of the group and a final value of the average power used by each consumer.

FIG. 11 is a diagram illustrating an example of the difference between the target power of the group and the final value of the average power used by each consumer. In the example illustrated in FIG. 11, the consumers included in the group, the target power of the group, and the limit values set for the respective consumers are similar to those in the example illustrated in FIG. 10. The final value (represented as "power usage" in the drawing) of the average power used by the consumer (1) is 160 kW, which is lower than a limit value of 200 kW by 40 kW. The final value of the average power used by the consumer (2) is 49 kW, which is substantially the same as the limit value. Likewise, the final value of the average power used by the consumer (3) is 98 kW, which is substantially the same as the limit value. The final value of the average power used by the consumer (4) is 299 kW, which is substantially the same as the limit value. The final value of the average power used by the consumer (5) is 200 kW, which is lower than a limit value of 250 kW by 50 kW. As a result, the total value of the final values of the average power used by the consumers is lower than the target power of the group by the 90 kW or more.

It can be said that the difference between the target power of the group and the total value of the final values of the average power used by the consumers represents a surplus of power that is available but is not used by the consumers included in the group. If reduction control is performed on the equipment devices 200 of the consumer (2), the consumer (3), and the consumer (4), for which the final values of average power used do not substantially deviate from the limit values, reduction control is performed for each individual consumer even though surplus power is available to the entire group. This leads to a decrease in the control efficiency for the equipment devices 200. In a case where such surplus power is generated, it is conceivable to reallocate the surplus power to a consumer for which reduction control is performed.

The reallocation of the surplus power is performed by, for example, resetting the limit values of the consumers included in the group. Specifically, among the consumers included in the group, the limit values of some of the consumers whose actual results of power usage are lower than the limit values are decreased, and the limit values of some of the consumers for which reduction control is performed are increased. In other words, the consumers included in the group interchange available power usage. In this case, the total value of the amounts of increase in the limit values of the consumers whose limit values are increased is set to be equal to or less than the total value of the amounts of decrease in the limit values of the consumers whose limit values are decreased. As a result, the total value of the average power used by the consumers included in the group can be prevented from exceeding the target power of the group.

Figure 12:
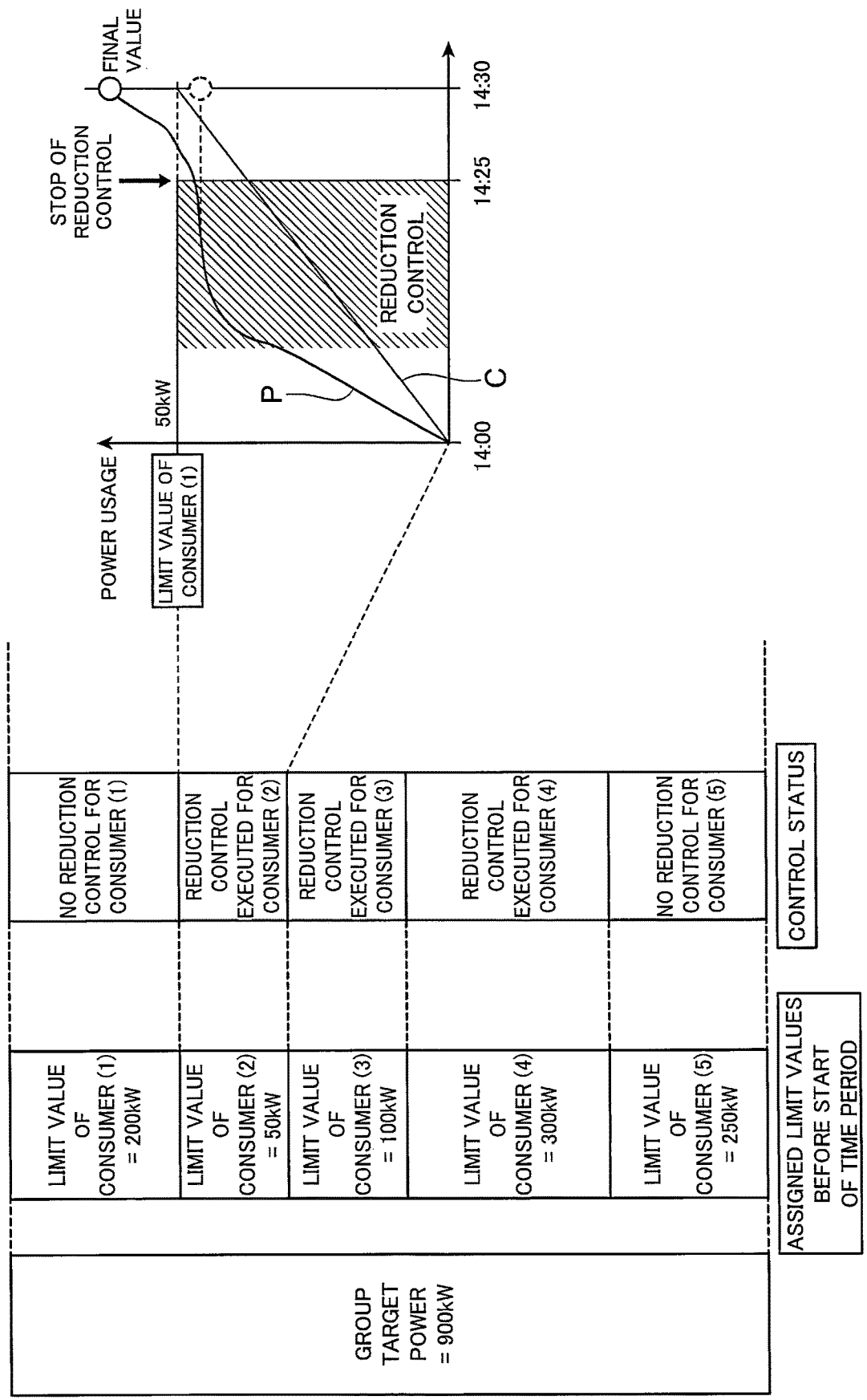
FIG. 12 is a diagram illustrating an example of control for increasing a limit value of a consumer.

FIG. 12 is a diagram illustrating an example of control for increasing a limit value of a consumer. In the example illustrated in FIG. 12, the consumers included in the group, the target power of the group, and the limit values set for the respective consumers are similar to those in the example illustrated in FIG. 10. In the example illustrated in FIG. 12, it is assumed that reduction control is performed on the consumer (2), the consumer (3), and the consumer (4). FIG. 12 represents a graph illustrating an example of actual results of power usage of the consumer (2). In the graph, as in the graphs illustrated in FIG. 10, the horizontal axis represents the time period (30 minutes), and the vertical axis represents the average power used over the time period, which is estimated from the actual results of power demand up to the respective time points over time. The control for increasing a limit value of a consumer is performed by, for example, stopping the reduction control for the target consumer.

The straight line C in the graph of the consumer (2) illustrated in FIG. 12 is a straight line reaching 50 kW at the end (14:30) of the time period. The actual power demand of the consumer (2) is larger than the average power used corresponding to the limit value in the initial stage of the time period. Thus, the curve P of the actual value deviates upward from the straight line C. Accordingly, as illustrated in FIG. 12, reduction control is performed on the equipment device 200 of the consumer (2) from the middle of the time period. As a result, the curve P of the actual values approaches the straight line C. Thereafter, when the limit value is adjusted and the reduction control is stopped, the curve P of the actual values deviates upward from the straight line C again. The final value of the average power used exceeds the initially set limit value (hereinafter referred to as an "initial limit value"). In the graph in FIG. 12, a hatched portion is a time period during which the reduction control is performed. In the illustrated example, the reduction control is started in the middle of the time period, and the reduction control is stopped five minutes (14:25) before the end (14:30) of the time period.

As illustrated in FIG. 12, the control for increasing the limit value is performed in the latter half of the time period. Specifically, the control is performed within a certain period preceding the end of the time period. This is because the control for increasing the limit value is performed after the confirmation of the execution of the reduction control in response to the difference between the actual results of the power usage in the first half of the time period and the initial limit value. In the example illustrated in FIG. 12, the control for increasing the limit value is performed five minutes before the end of the time period, as described above. The times illustrated in FIG. 12 are merely examples. The timing at which the reduction control is started and the timing at which the reduction control is stopped are individually determined based on the type and operating status of the equipment device 200 to be controlled, the specification and operation of the control device 100 and the entire system, and the like.

Figure 13:
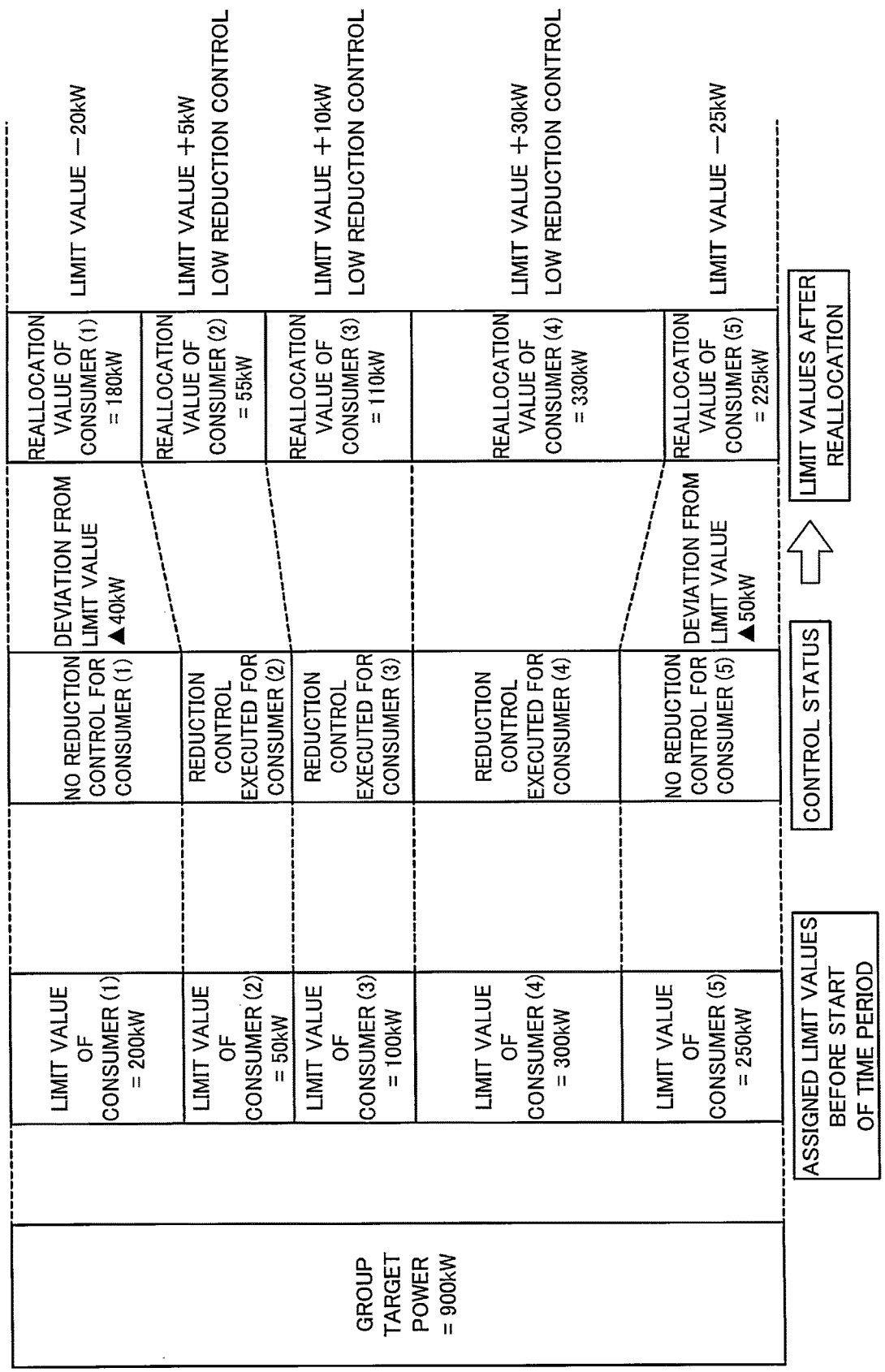
FIG. 13 is a diagram illustrating a relationship among the target power of the group, an initial limit value of each consumer, and a limit value after surplus power is reallocated.

FIG. 13 is a diagram illustrating a relationship among the target power of the group, an initial limit value of each consumer, and a limit value after surplus power is reallocated. In the example illustrated in FIG. 13, the consumers included in the group, the target power of the group, and the initial limit values set for the respective consumers are similar to those in the example illustrated in FIG. 10. It is assumed that, as in the example illustrated in FIG. 12, reduction control is performed on the equipment devices 200 of the consumer (2), the consumer (3), and the consumer (4) in the middle of the time period. Then, the limit values are set again to reallocate the surplus power.

In the example illustrated in FIG. 13, the amount of deviation (decrease) of the actual power usage of the consumer (1) from the initial limit value is set to 40 kW. The amount of deviation (decrease) of the actual power usage of the consumer (5) from the initial limit value is set to 50 kW. As a result, the entire group has a surplus power of 90 kW. Then, one-half (½) of the power corresponding to the amounts of deviation of the consumer (1) and the consumer (5) in which the decrease in the actual results of the power usage relative to the initial limit values is recognized is allocated to the consumer (2), the consumer (3), and the consumer (4) for which the reduction control is performed. In an example, the power is allocated according to the ratio of the initial limit values of the consumers to which the power is to be allocated. Specifically, a power of 45 kW, which is one-half (½) of 90 kW, is allocated according to the ratio of the initial limit value of the consumer (2), namely, 50 kW, the initial limit value of the consumer (3), namely, 100 kW, and the initial limit value of the consumer (4), namely, 300 kW, such that the consumer (2) is allocated 5 kW, the consumer (3) is allocated 10 kW, and the consumer (4) is allocated 30 kW.

As a result, as illustrated in FIG. 13, the limit values set again for the respective consumers are as follows:

180 kW(=200−40÷2) for the consumer (1);

55 kW(=50+45÷(50+100+300)×50) for the consumer (2);

110 kW(=100+45÷(50+100+300)×100) for the consumer (3);

330 kW(=300+45÷(50+100+300)×300) for the consumer (4); and 225 kW(=250−50÷2) for the consumer (5).

The method for setting the limit values again, described above, is merely an example, and the method for setting the limit values again and reallocating the surplus power is not limited to the specific method described above. For example, the power to be distributed is not limited to one-half (½) of the surplus power. The power is not necessarily distributed to the consumers according to the ratio of the initial limit values of the consumers, as described above. For example, the power may be equally divided according to the number of consumers as the distribution targets (in the example in FIG. 13, three consumers). Any of various other methods may be used to allocate the surplus power and set the limit values again.

The conditions for allocating the surplus power and setting the limit values again can be variously determined based on the power usage of the consumers included in the group over the time period and the total value thereof. The distribution of the surplus power and the setting of the limit values again may be executed on condition that, for example, the difference between the target power of the group and the total value of the power usage of the consumers becomes equal to or greater than a predetermined value at a certain time point within the time period. Alternatively, the distribution of the surplus power and the setting of the limit values again may be executed on condition that the reduction control is performed on the equipment device 200 of any consumer within the time period. Alternatively, these events may be combined as the condition for execution. Alternatively, conditions can be individually set in a specific control system.

<Other Application Examples of Power Control according to Present Disclosure>

The above embodiment has described an example configuration of a control system for allocating the power corresponding to target power set for a group to consumers included in the group and controlling the power use by the equipment devices 200 of the consumers. The control system of the present embodiment can be applied to not only the configuration described above but also various configurations for allocating the power corresponding to target power set for a group including a plurality of units of power consumption to the units of power consumption.

For example, the control system of the present embodiment can be applied to a configuration in which one or more consumers distribute the power allocated thereto to a plurality of equipment devices 200 thereof. In this case, a plurality of equipment devices 200 owned by one consumer constitute one group, and each of the equipment devices 200 is a unit of power consumption. The control device 100 that controls the equipment devices 200 of one consumer allocates power in a range of a limit value given to the consumer to the equipment devices 200 and performs control. The power can be allocated to the equipment devices 200 in a manner similar to that for, for example, predicting the power usage of each of the equipment devices 200 over each time period and setting a limit value for each consumer by the server 300 described above. In such control, accordingly, a limit value per equipment device 200 (power usage available to each equipment device 200) is set for each equipment device 200. The control device 100 determines whether the total value of the actual values of the power usage of the equipment devices 200 over the time period deviates from the limit value of the consumer (whether surplus power is generated) based on the actual operating status of each of the equipment devices 200. If surplus power is generated, the limit values of the equipment devices 200 are adjusted such that the equipment devices 200 interchange the power usage available to the equipment devices 200.

Further, the control system of the present embodiment can be applied to a configuration in which a plurality of equipment devices 200 owned by one consumer are installed in a plurality of facilities in a distributed manner and the consumer distributes the power allocated thereto to the facilities in which the equipment devices 200 thereof are installed. In this case, the plurality of facilities in which the equipment devices 200 of the consumer are installed constitute one group, and each of the facilities is a unit of power consumption. The control device 100 that controls the equipment devices 200 of one consumer distributes power in a range of a limit value given to the consumer to the facilities in which the equipment devices 200 are installed and performs control. The power can be allocated to the facilities in a manner similar to that for, for example, predicting the power usage of each of the equipment devices 200 installed in the facilities over each time period and setting a limit value for each consumer by the server 300 described above. In such control, accordingly, a limit value per facility (power usage available to each facility) is set for each facility. The control device 100 determines whether the total value of the actual values of the power usage of the equipment device 200 in each facility over the time period deviates from the limit value of the consumer (whether surplus power is generated) based on the actual operating status of the equipment device 200 in each facility. If surplus power is generated, the limit values of the facilities are adjusted such that the facilities interchange the power usage available to the facilities.

While an embodiment has been described above, the technical scope of the present disclosure is not limited to the embodiment described above. For example, in the embodiment described above, a limit value is set before the start of the time period during which control based on control information is performed, and the limit value can be adjusted after the start of the time period. Alternatively, instead of a limit value being set before the start of the time period, a limit value may be set in accordance with the operating status of the equipment devices 200 within the time period. In the embodiment described above, the server 300 adjusts the limit value after the start of the time period. Alternatively, the control device 100 may adjust the limit value. In this case, when a plurality of control devices 100 control the equipment devices 200 of all of the consumers included in the group, the control devices 100 may exchange information on the operating status of the equipment devices 200 and adjust the limit values in accordance with the obtained information. Various modifications and substitutions of configurations that are made without departing from the scope of the technical idea of the present disclosure are included in the present disclosure.

Here, the embodiment described above may be implemented as follows. A power control system of the present disclosure is a power control system for performing power control such that a target power set for a group including a plurality of units of power consumption is not exceeded, the system including a limit value setting unit 330 that sets, for each of the units of power consumption, a limit value of power usage for a predetermined time period, based on the target power; and a limit value adjustment unit 370 that adjusts, within the predetermined time period, the limit value of each of the units of power consumption for the predetermined time period, based on an actual result of power usage within the predetermined time period.

This configuration can control power usage of a group including a plurality of units of power consumption such that control for each unit of power consumption is adjusted in accordance with the use of power by each individual unit of power consumption over each time period to reduce unused power in the entire group.

The limit value adjustment unit 370 may adjust the limit value of each of the units of power consumption on condition that a difference between total power usage of the units of power consumption included in the group and the target power is equal to or greater than a predetermined value.

This configuration can adjust the limit values based on the total power usage of the units of power consumption and reduce the unused power in the entire group.

Further, the limit value adjustment unit 370 may adjust the limit value such that the units of power consumption interchange power usage, in accordance with power usage of each of the units of power consumption over the predetermined time period.

This configuration allows units of power consumption to interchange available power usage, which is indicated by the limit value, and can reduce the unused power in the entire group.

Further, the power control system may further include a control device 100 that controls power usage of each of the units of power consumption, based on the limit value set by the limit value setting unit, and when there is the unit of power consumption whose power usage is reduced by control based on the limit value by the control device 100, the limit value adjustment unit 370 may adjust the limit value of the unit of power consumption.

This configuration can adjust the limit values based on the control status for the units of power consumption and reduce the unused power in the entire group.

Further, the limit value adjustment unit 370 may adjust the limit value of each of the units of power consumption within a certain period preceding an end of the predetermined time period.

This configuration can provide appropriate control of the power usage for each unit of power consumption at the end of a time period in which actual power demands significantly affects the units of power consumption, and reduce the unused power in the entire group.

Further, the limit value adjustment unit 370 may increase the limit value of at least one unit of power consumption among the units of power consumption and decrease the limit value of at least another unit of power consumption among the units of power consumption in accordance with power usage of each of the units of power consumption over the predetermined time period.

This configuration allows units of power consumption to interchange available power usage, which is indicated by the limit value, and can reduce the unused power in the entire group.

Further, the limit value adjustment unit 370 may adjust the limit value of each of the units of power consumption such that a total amount of increase in the limit value of a unit of power consumption whose the limit value is increased does not exceed a total amount of decrease in the limit value of a unit of power consumption whose the limit value is decreased.

With this configuration, even when the limit values are adjusted, control is performed such that the total power usage of the units of power consumption does not exceed the target power, thereby making it possible to reduce the unused power in the entire group.

Further, the units of power consumption may be consumers, the limit value setting unit 330 may set, for each of the consumers, a limit value of power usage for a predetermined time period, based on a target power set for a group of the consumers, and the limit value adjustment unit 370 may adjust the limit value of each of the units of power consumption for the predetermined time period, based on actual results of power usage of the consumers within the predetermined time period.

This configuration can control power usage of a group including a plurality of consumers such that control for each consumer is adjusted in accordance with the use of power by each individual consumer over each time period to reduce unused power in the entire group.

Further, the units of power consumption may be equipment devices, the limit value setting unit 330 may set, for each of the equipment devices, a limit value of power usage for a predetermined time period, based on a target power set for a group of the equipment devices, and the limit value adjustment unit 370 may adjust the limit value of each of the units of power consumption for the predetermined time period, based on actual results of power usage of the equipment devices within the predetermined time period.

This configuration can control power usage of a group including a plurality of equipment devices such that control for each equipment device is adjusted in accordance with the use of power by each individual equipment device over each time period to reduce unused power in the entire group.

A program of the present disclosure is a program for causing a computer for controlling a system for performing power control such that a target power set for a group including a plurality of units of power consumption is not exceeded, to function as a limit value setting unit 330 that sets, for each of the units of power consumption, a limit value of power usage for a predetermined time period, based on the target power; and a limit value adjustment unit 370 that adjusts, within the predetermined time period, the limit value of each of the units of power consumption for the predetermined time period, based on an actual result of power usage within the predetermined time period.

A computer having installed therein the program can control power usage of a group including a plurality of units of power consumption such that control for each unit of power consumption is adjusted in accordance with the use of power by each individual unit of power consumption over each time period to reduce unused power in the entire group.

REFERENCE SIGNS LIST

100 control device
110 control information acquisition unit
120 operation information acquisition unit
130 storage unit
140 control instruction generation unit
150 control instruction output unit
160 operation information output unit
200 equipment device
210 acceptance unit
220 operation control unit 230 output unit
300 server
310 group management unit
320 first prediction unit
330 limit value setting unit
340 control information generation unit
350 second prediction unit
360 actual result information acquisition unit
370 limit value adjustment unit
380 transmission control unit

The invention claimed is:

1. A power control system for performing power control such that a target power set for a group including a plurality of units of power consumption is not exceeded, the system comprising:
   limit value setting unit that sets, for each of the units of power consumption corresponding to equipment devices or consumers, a limit value of power usage for a predetermined time period, based on the target power set for a group of the equipment devices or the consumers;
   adjustment unit that adjusts, within the predetermined time period, the limit value of each of the units of power consumption for the predetermined time period, based on actual results of power usage of the equipment devices or the consumers within the predetermined time period; and
   control unit that controls power usage of each of the equipment devices or the consumers based on the limit value set by the limit value setting unit, to reduce unused power for the group including the plurality of units of power consumption, wherein
   the adjustment unit adjusts the limit value of each of the equipment devices or the consumers on condition that a difference between total power usage of the units of power consumption included in the group and the target power is equal to or greater than a predetermined value.

2. The power control system according to claim 1, wherein the adjustment unit adjusts the limit value such that the units of power consumption interchange power usage, in accordance with power usage of each of the units of power consumption over the predetermined time period.

3. The power control system according to claim 1, wherein
   when there is the unit of power consumption whose power usage is reduced by control based on the limit value by the control unit, the adjustment unit adjusts the limit value of the unit of power consumption.

4. The power control system according to claim 1, wherein the adjustment unit increases the limit value of at least one unit of power consumption among the units of power consumption and decreases the limit value of at least another unit of power consumption among the units of power consumption in accordance with power usage of each of the units of power consumption over the predetermined time period.

5. The power control system according to claim 4, wherein the adjustment unit adjusts the limit value of each of the units of power consumption such that a total amount of increase in the limit value of a unit of power consumption whose the limit value is increased does not exceed a total amount of decrease in the limit value of a unit of power consumption whose the limit value is decreased.

6. A power control system for performing power control such that a target power set for a group including a plurality of units of power consumption is not exceeded, the system comprising:
   limit value setting unit that sets, for each of the units of power consumption corresponding to equipment devices or consumers, a limit value of power usage for a predetermined time period, based on the target power set for a group of the equipment devices or the consumers;
   adjustment unit that adjusts, within the predetermined time period, the limit value of each of the units of power consumption within a certain period preceding an end of the predetermined time period, based on actual results of power usage of the equipment devices or the consumers within the predetermined time period, and does not adjust the limit value of each of the units of power consumption except for the certain period preceding the end of the predetermined time period; and
   control unit that controls power usage of each of the equipment devices or the consumers based on the limit value set by the limit value setting unit, to reduce unused power for the group including the plurality of units of power consumption, wherein
   the adjustment unit adjusts the limit value of each of the equipment devices or the consumers on condition that a difference between total power usage of the units of power consumption included in the group and the target power is equal to or greater than a predetermined value.

7. A non-transitory computer readable medium storing a program for causing a computer for controlling a system for performing power control such that a target power set for a group including a plurality of units of power consumption is not exceeded, to function as:
   limit value setting unit that sets, for each of the units of power consumption corresponding to equipment devices or consumers, a limit value of power usage for a predetermined time period, based on the target power set for a group of the equipment devices or the consumers;
   adjustment unit that adjusts, within the predetermined time period, the limit value of each of the units of power consumption for the predetermined time period, based on actual results of power usage of the equipment devices or the consumers within the predetermined time period; and
   control unit that controls power usage of each of the equipment devices or the consumers based on the limit value set by the limit value setting unit, to reduce unused power for the group including the plurality of units of power consumption, wherein
   the adjustment unit adjusts the limit value of each of the equipment devices or the consumers on condition that a difference between total power usage of the units of power consumption included in the group and the target power is equal to or greater than a predetermined value.

8. A non-transitory computer readable medium storing a program for causing a computer for controlling a system for performing power control such that a target power set for a group including a plurality of units of power consumption is not exceeded, to function as:
   limit value setting unit that sets, for each of the units of power consumption corresponding to equipment devices or consumers a limit value of power usage for a predetermined time period, based on the target power set for a group of the equipment devices or the consumers;
   adjustment unit that adjusts, within the predetermined time period, the limit value of each of the units of power consumption within a certain period preceding an end of the predetermined time period, based on actual results of power usage of the equipment devices or the consumers within the predetermined time period, and does not adjust the limit value of each of the units of power consumption except for the certain period preceding the end of the predetermined time period; and control unit that controls power usage of each of the equipment devices or the consumers based on the limit value set by the limit value setting unit, to reduce unused power for the group including the plurality of units of power consumption, wherein the adjustment unit adjusts the limit value of each of the equipment devices or the consumers on condition that a difference between total power usage of the units of power consumption included in the group and the target power is equal to or greater than a predetermined value.

* * * * *